US012050705B2

(12) United States Patent
Hassan et al.

(10) Patent No.: US 12,050,705 B2
(45) Date of Patent: Jul. 30, 2024

(54) ENHANCED SECURITY FEATURES FOR CONTROLLING ACCESS TO SHARED CONTENT AND PRIVATE CONTENT OF A SHARED DOCUMENT

(71) Applicant: MICROSOFT TECHNOLOGY LICENSING, LLC, Redmond, WA (US)

(72) Inventors: Amer Aref Hassan, Kirkland, WA (US); Mahendra D. Sekaran, Sammamish, WA (US); Edward C Giaimo, III, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 385 days.

(21) Appl. No.: 17/565,127

(22) Filed: Dec. 29, 2021

(65) Prior Publication Data

US 2023/0205904 A1 Jun. 29, 2023

(51) Int. Cl.
*H04L 12/24* (2006.01)
*G06F 16/176* (2019.01)
*G06F 21/62* (2013.01)
*H04L 29/06* (2006.01)

(52) U.S. Cl.
CPC ........ *G06F 21/6209* (2013.01); *G06F 16/176* (2019.01); *G06F 2221/2141* (2013.01); *G06F 2221/2147* (2013.01)

(58) Field of Classification Search
CPC ............................ G06F 21/6209; G06F 16/176
USPC ........................................................ 726/26
See application file for complete search history.

(56) References Cited

U.S. PATENT DOCUMENTS

| 6,687,878 | B1 | | 2/2004 | Eintracht et al. |
| 9,781,179 | B2 | | 10/2017 | Hong et al. |
| 10,229,099 | B2 | | 3/2019 | Sekharan |
| 10,551,993 | B1 | * | 2/2020 | Sanocki .................. G06F 3/017 |
| 10,630,738 | B1 | | 4/2020 | Vendrow et al. |
| 11,093,703 | B2 | * | 8/2021 | Viégas .................. G06F 3/0482 |

(Continued)

FOREIGN PATENT DOCUMENTS

WO 2015017886 A1 2/2015

OTHER PUBLICATIONS

"4 Different Ways to Password Protect WordPress", Retrieved from: https://themeisle.com/blog/password-protect-wordpress/, Retrieved Date: Jun. 23, 2021, 14 Pages.

(Continued)

*Primary Examiner* — Haresh N Patel
(74) *Attorney, Agent, or Firm* — Scott Y. Shigeta; Newport IP, LLC

(57) ABSTRACT

The techniques disclosed herein provide enhanced security features for controlling access to shared content and private content of a document. A system can enable multiple users to access a common content file, such as a Word document. Each user can add additional private content unique to each individual user. Private content associated with a particular user is restricted from being shared with any other user. Thus, when a first user opens a file authored and/or owned by other users stored in a cloud storage service, the system allows that first user to see the common content that is shared by the other users plus private content that is unique to the first user, but not allow the first user to view other private content provided by the other users.

20 Claims, 24 Drawing Sheets

(56) References Cited

U.S. PATENT DOCUMENTS

| | | | |
|---|---|---|---|
| 11,481,550 B2* | 10/2022 | Sivaji | G06F 40/258 |
| 11,500,517 B2* | 11/2022 | Song | G06F 9/44505 |
| 11,645,455 B2* | 5/2023 | Hariri | G06F 40/169 |
| | | | 715/751 |
| 11,861,296 B2* | 1/2024 | Hariri | G06F 40/134 |
| 2012/0110323 A1 | 5/2012 | Colclasure et al. | |
| 2015/0373063 A1 | 12/2015 | Vashishtha et al. | |
| 2015/0378974 A1 | 12/2015 | Massand | |
| 2015/0378995 A1 | 12/2015 | Brown et al. | |
| 2016/0188887 A1 | 6/2016 | Ghafourifar et al. | |
| 2017/0017551 A1 | 1/2017 | Czeisler et al. | |
| 2017/0201372 A1 | 7/2017 | Tomomura | |
| 2017/0201782 A1* | 7/2017 | Lindsey | G06F 18/22 |
| 2017/0249394 A1 | 8/2017 | Loeb et al. | |
| 2018/0336364 A1* | 11/2018 | Haila | G06F 21/6227 |
| 2019/0129968 A1 | 5/2019 | Neylan et al. | |
| 2019/0163927 A1 | 5/2019 | Kochura et al. | |
| 2019/0334917 A1* | 10/2019 | Demmler | G06F 21/6218 |
| 2020/0089897 A1* | 3/2020 | Shelton | H04L 63/02 |
| 2020/0134001 A1 | 4/2020 | Kantamsetty et al. | |
| 2020/0265693 A1* | 8/2020 | Lindsey | G08B 13/19673 |
| 2021/0073398 A1 | 3/2021 | Hamlin et al. | |
| 2021/0240672 A1* | 8/2021 | Dillon | G06F 16/148 |
| 2022/0067191 A1* | 3/2022 | Upton | G06F 16/9038 |
| 2022/0080319 A1* | 3/2022 | Lee | A63F 13/355 |

OTHER PUBLICATIONS

Bateman, Scott, "Collaborative Tagging: Folksonomy, Metadata, Visualization, E-Learning, Thesis", In Thesis of University of Saskatchewan, Dec. 12, 2007, 153 Pages.

Hernandez, et al., "Mucura: your personal file repository in the cloud", In Journal of Physics: Conference Series, vol. 396, Distributed Processing and Analysis on Grids and Clouds, 2012, 9 Pages.

Klingelhuber, et al., "Private Notes: Encrypted XML Notes Synchronization and Sharing with Untrusted Web Services", In Proceedings of the 13th International Conference on Information Integration and Web-based Applications and Services, Dec. 2011, 8 Pages.

Puthuparambil, Ceenu, "The next generation of annotation systems: designing to support themaking of online private and public notes", In Dissertation of the University of Bath, Jun. 2010, 102 Pages.

"International Search Report and Written Opinion Issued In PCT Application No. PCT/US22/046495", Mailed Date: Jan. 19, 2023, 11 Pages.

* cited by examiner

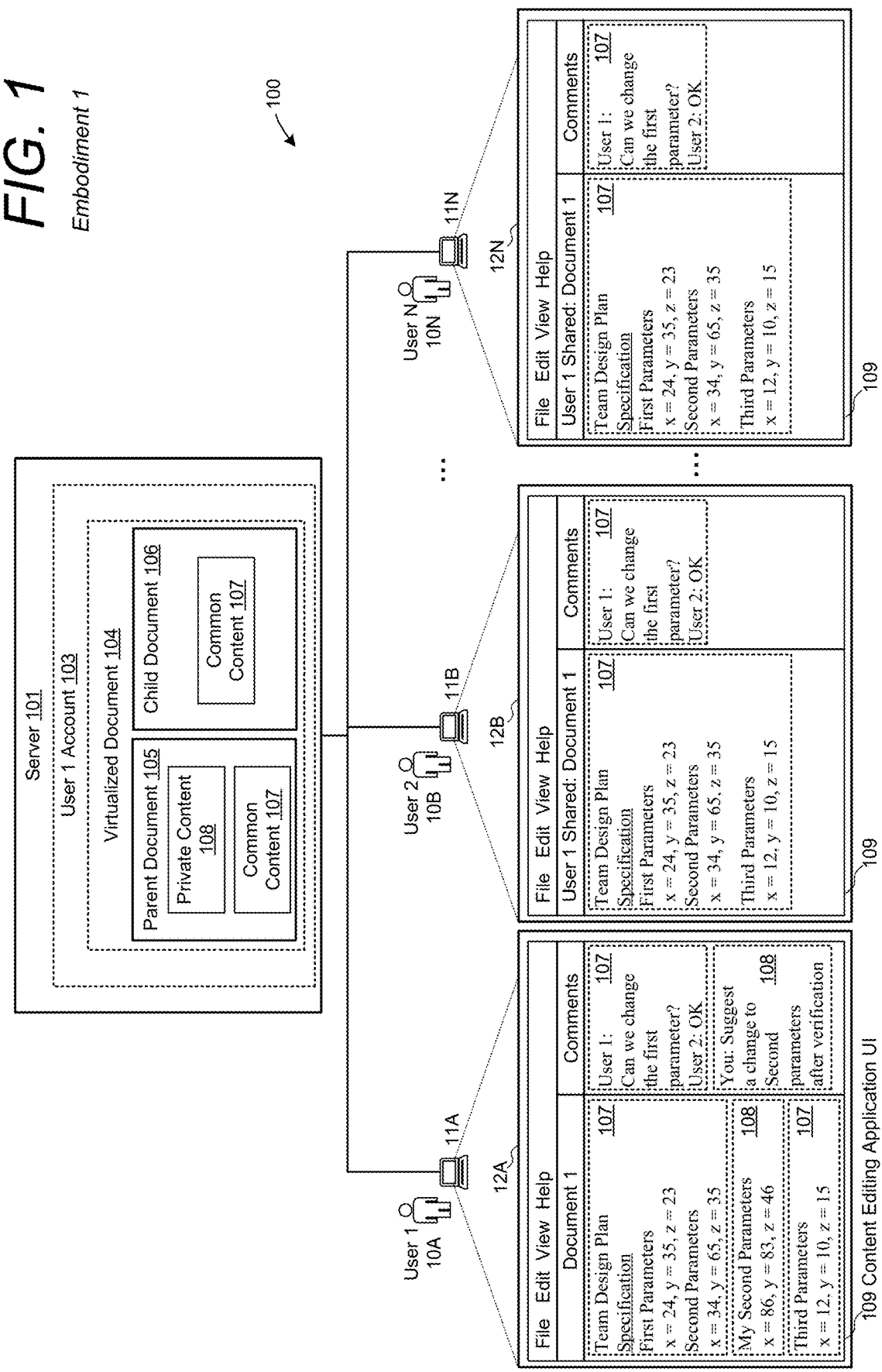

*First user starts with document with general content*

Selection of private content causes the generation of virtualized document having a parent file and child file

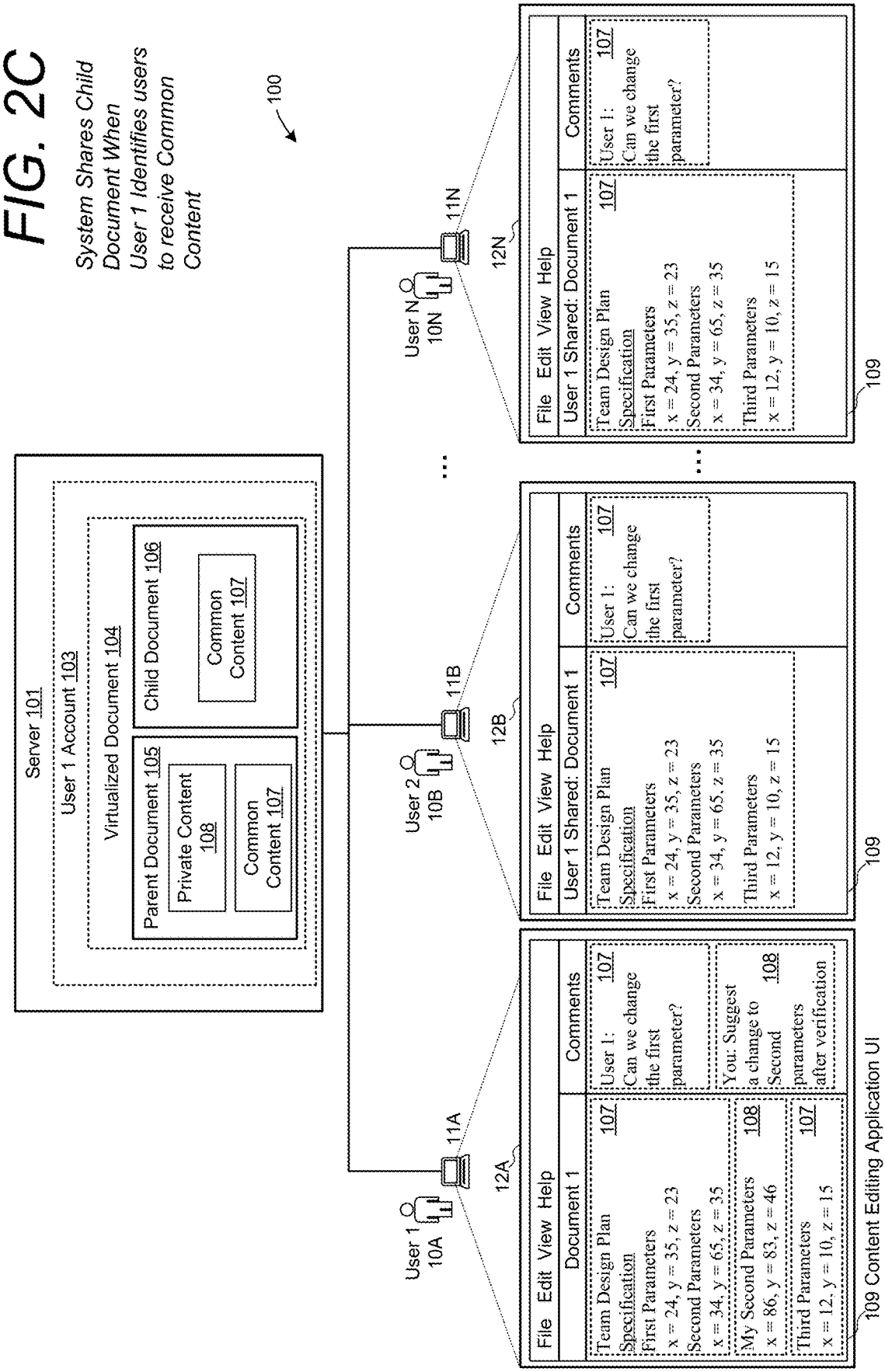

Edits from User 2 are written to Child Document

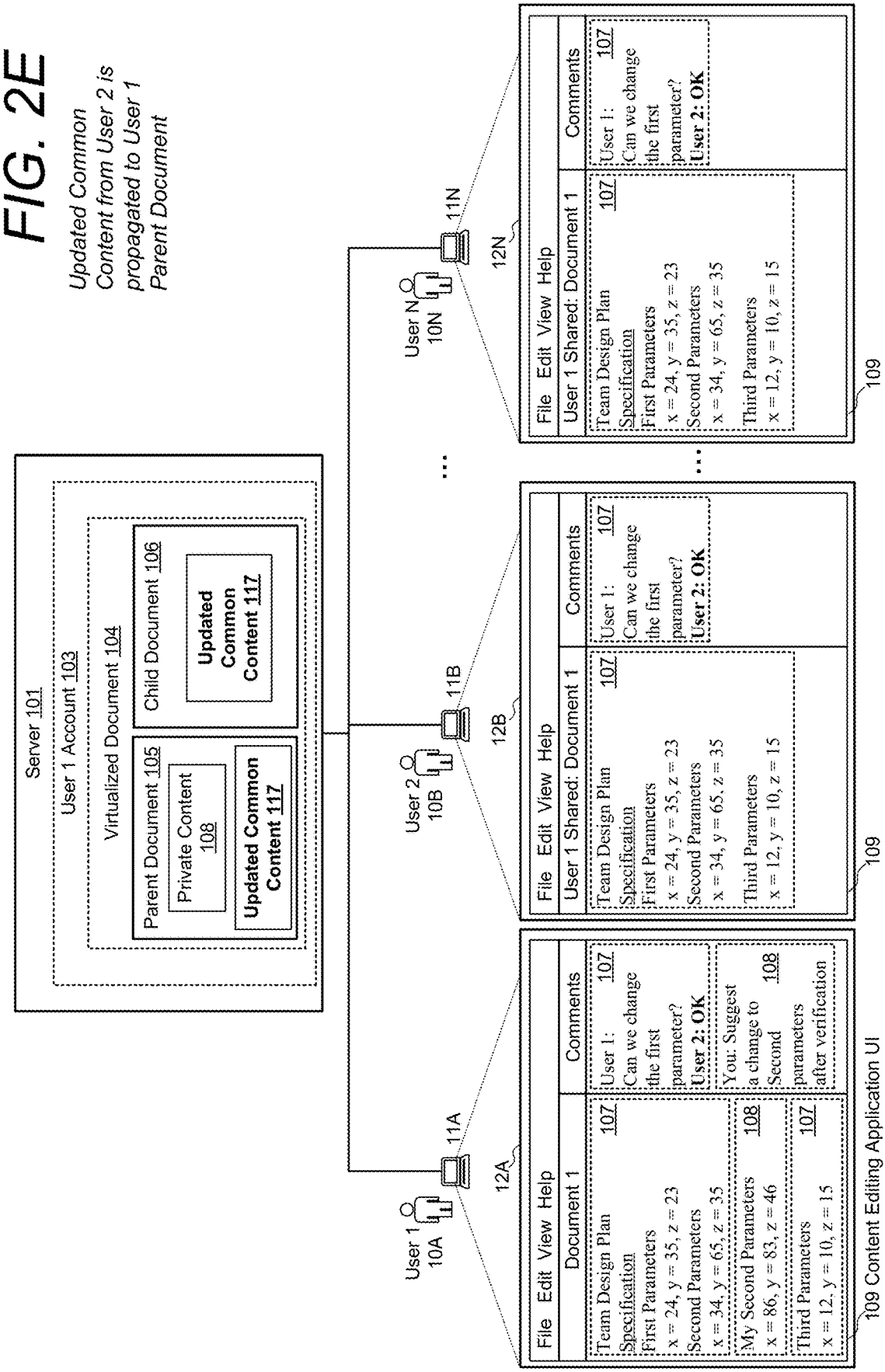

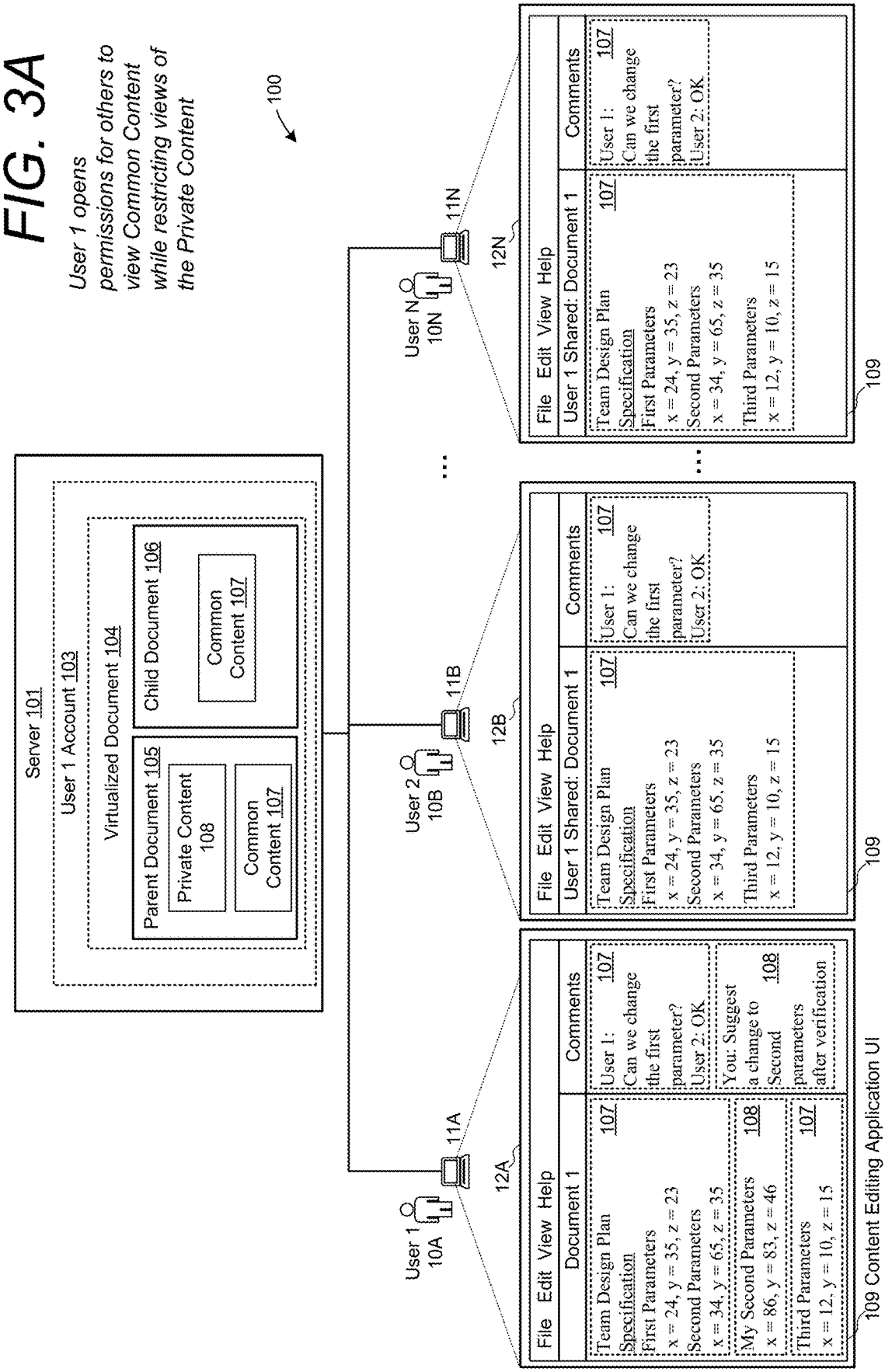

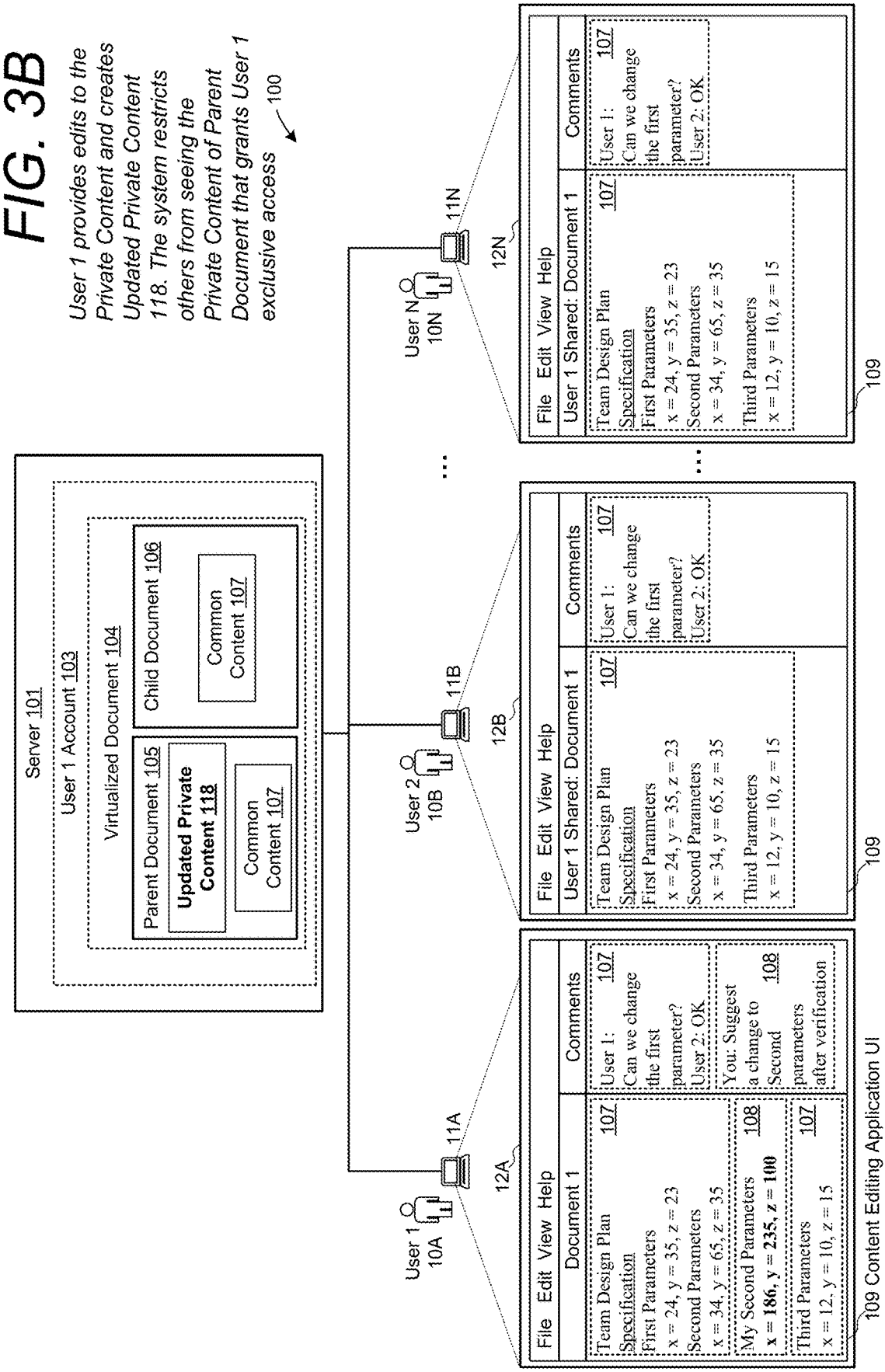

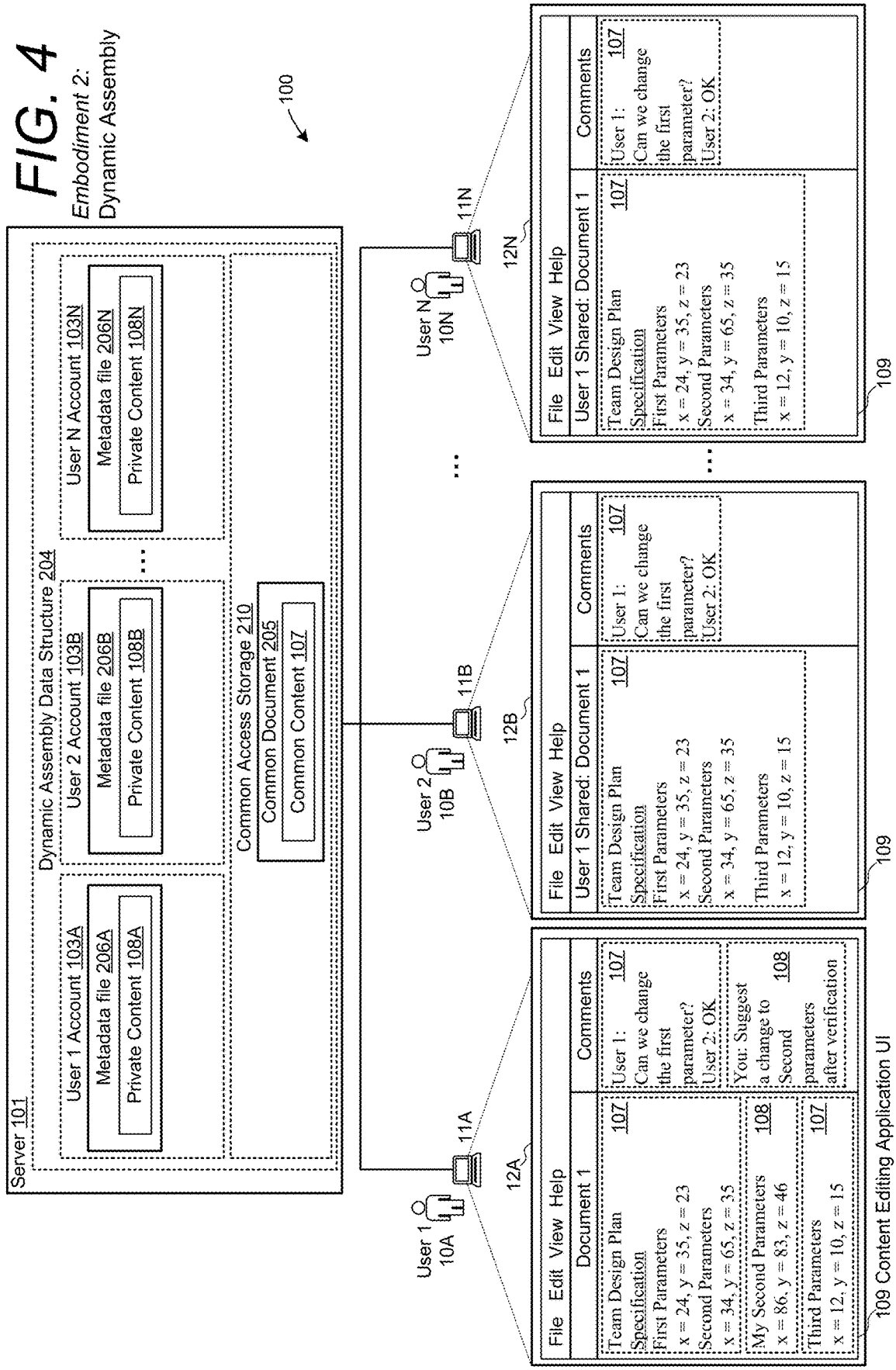

First user starts with document with general content

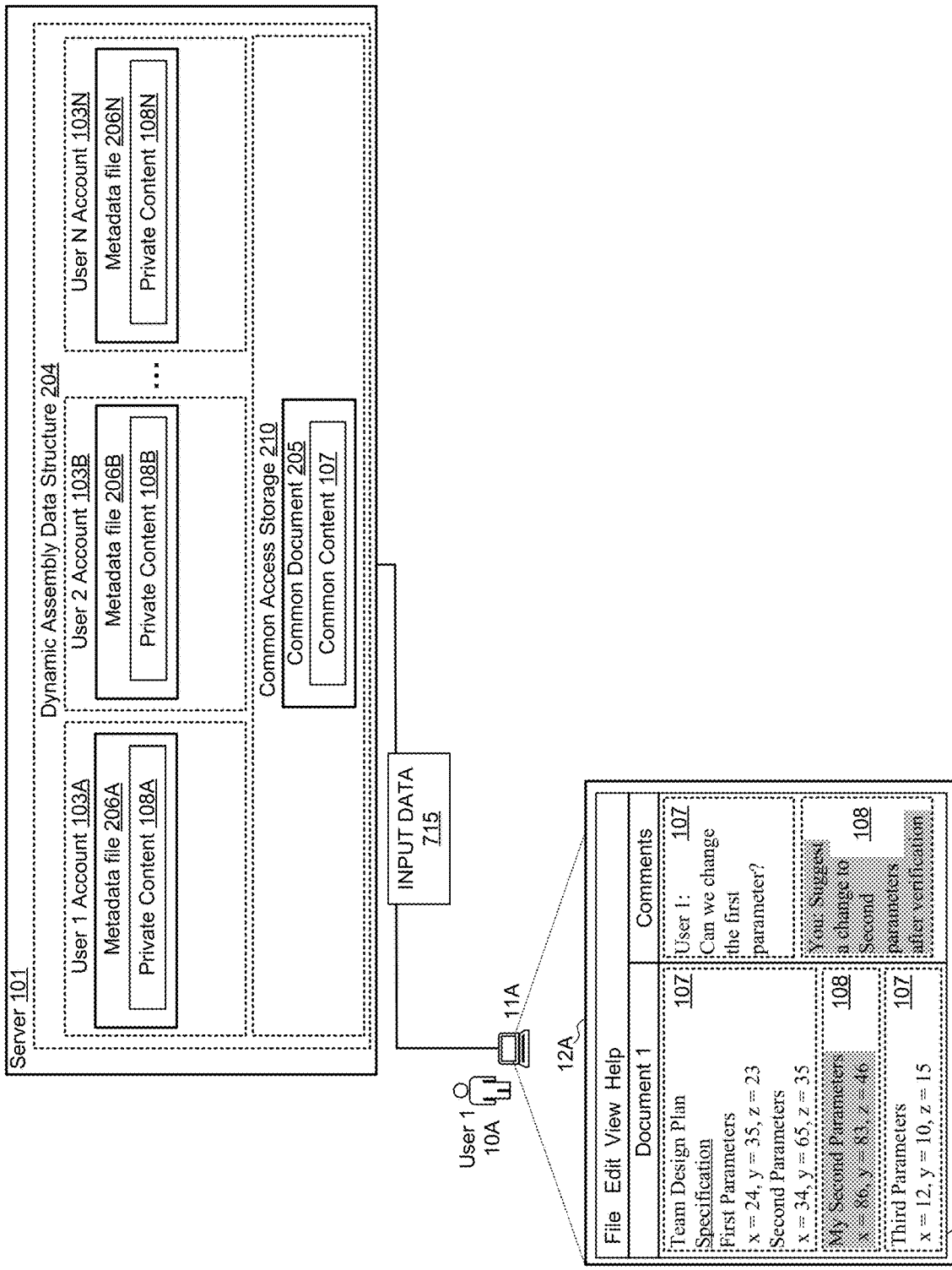

Embodiment 2: Dynamic Assembly, Access for Viewing

*Embodiment 2: Dynamic Assembly*

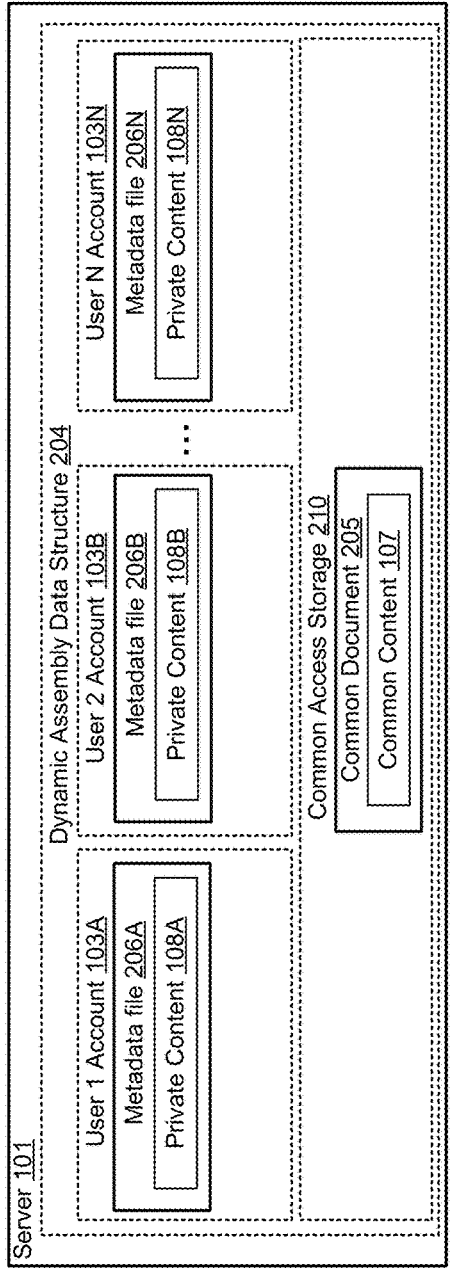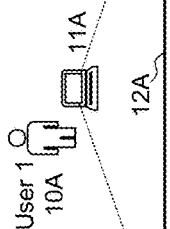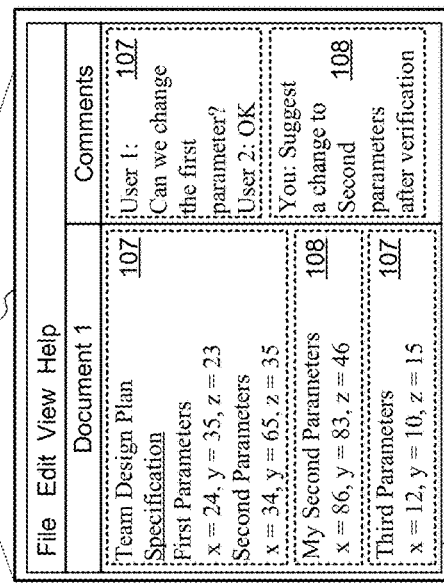
FIG. 6C
*Embodiment 2: Dynamic Assembly*

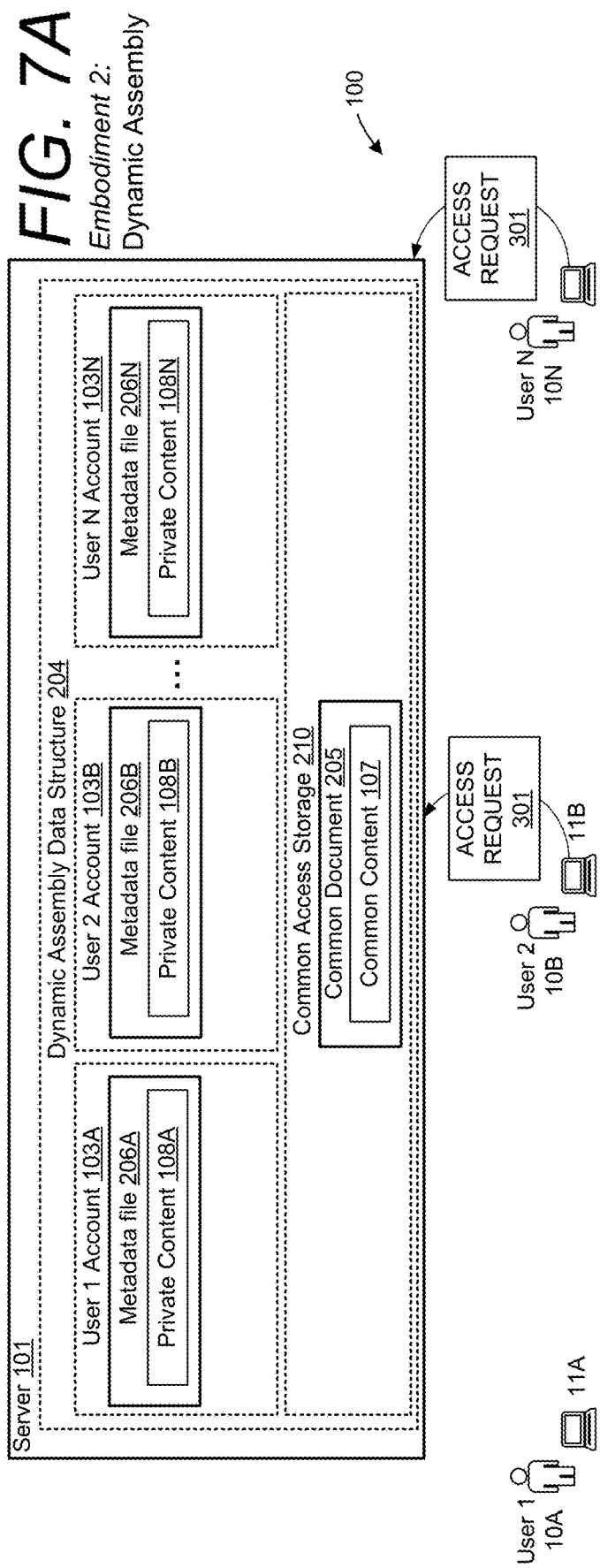

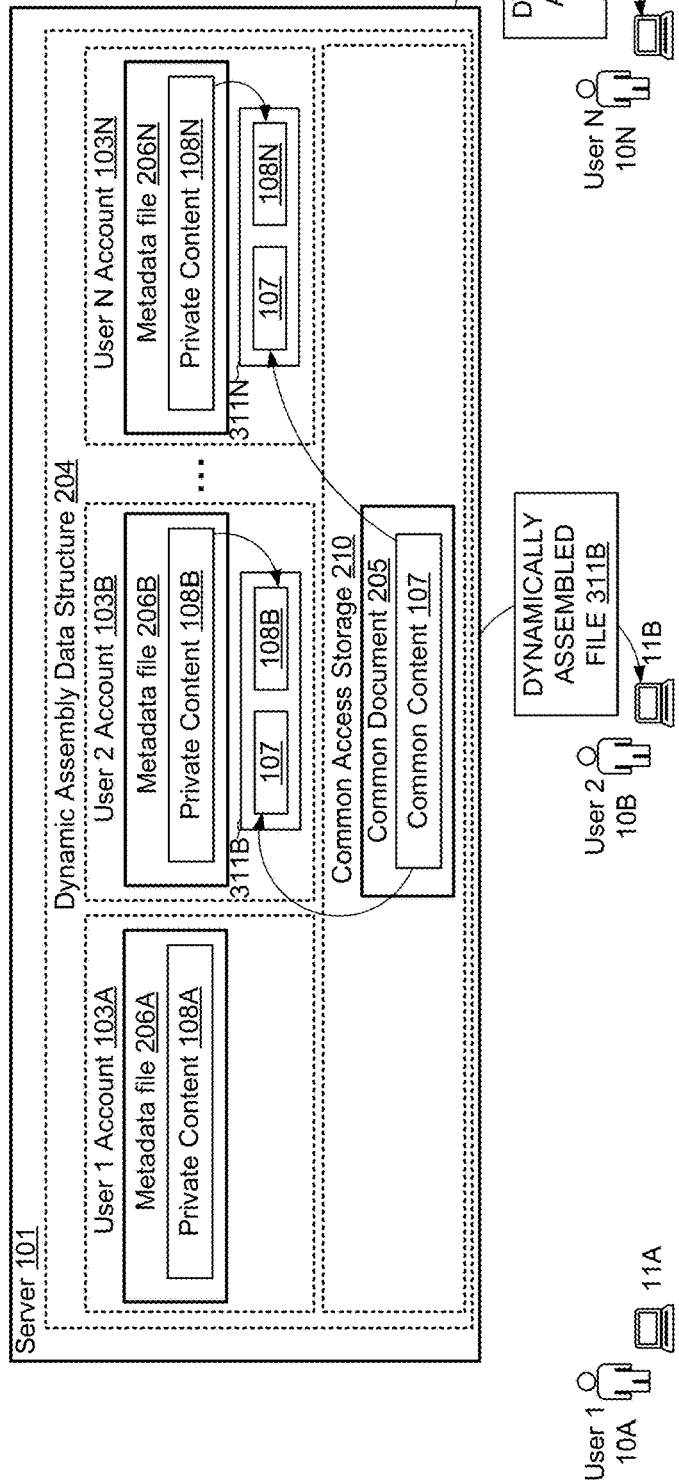

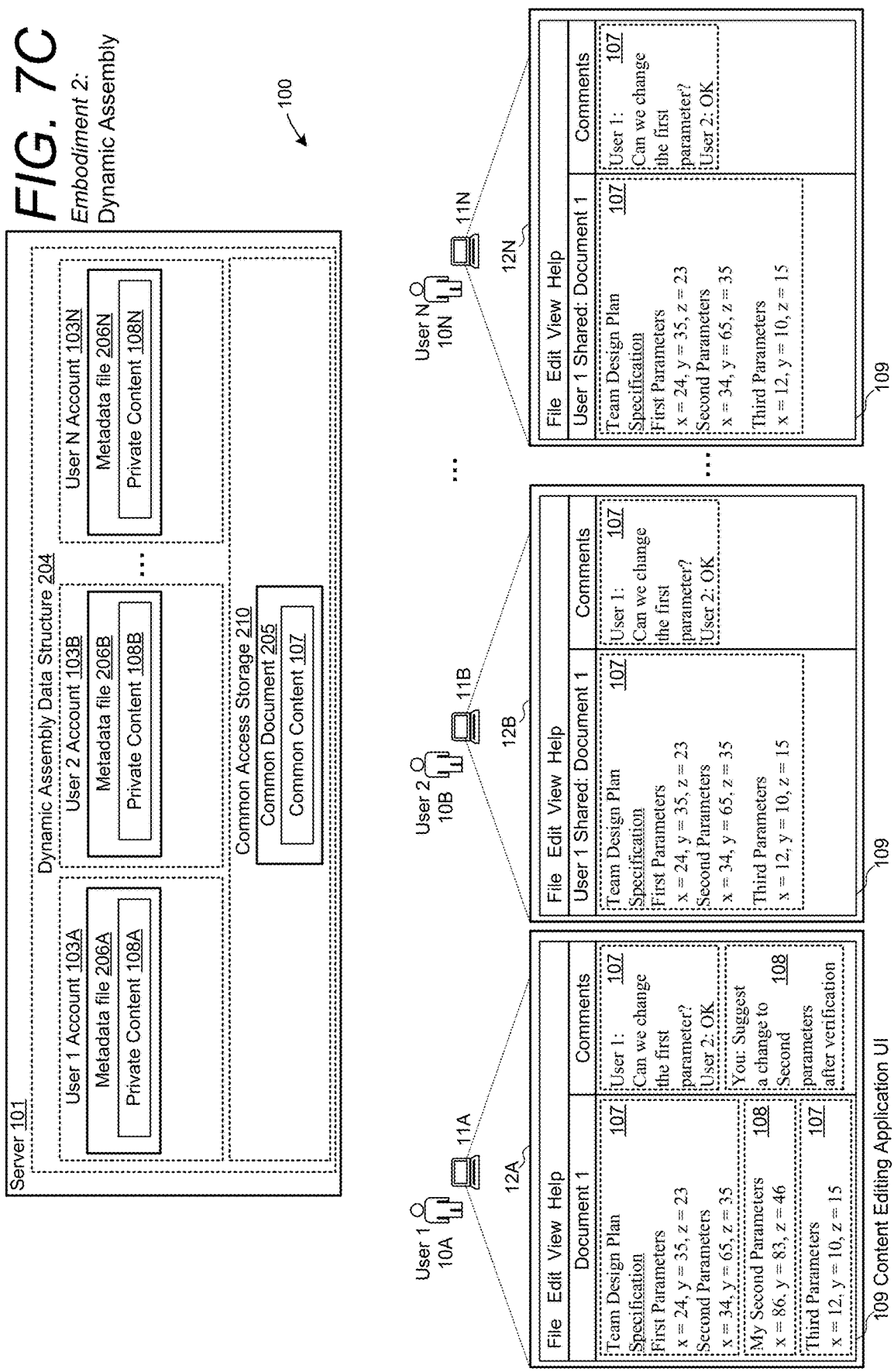

*Embodiment 2: Dynamic Assembly Edits*

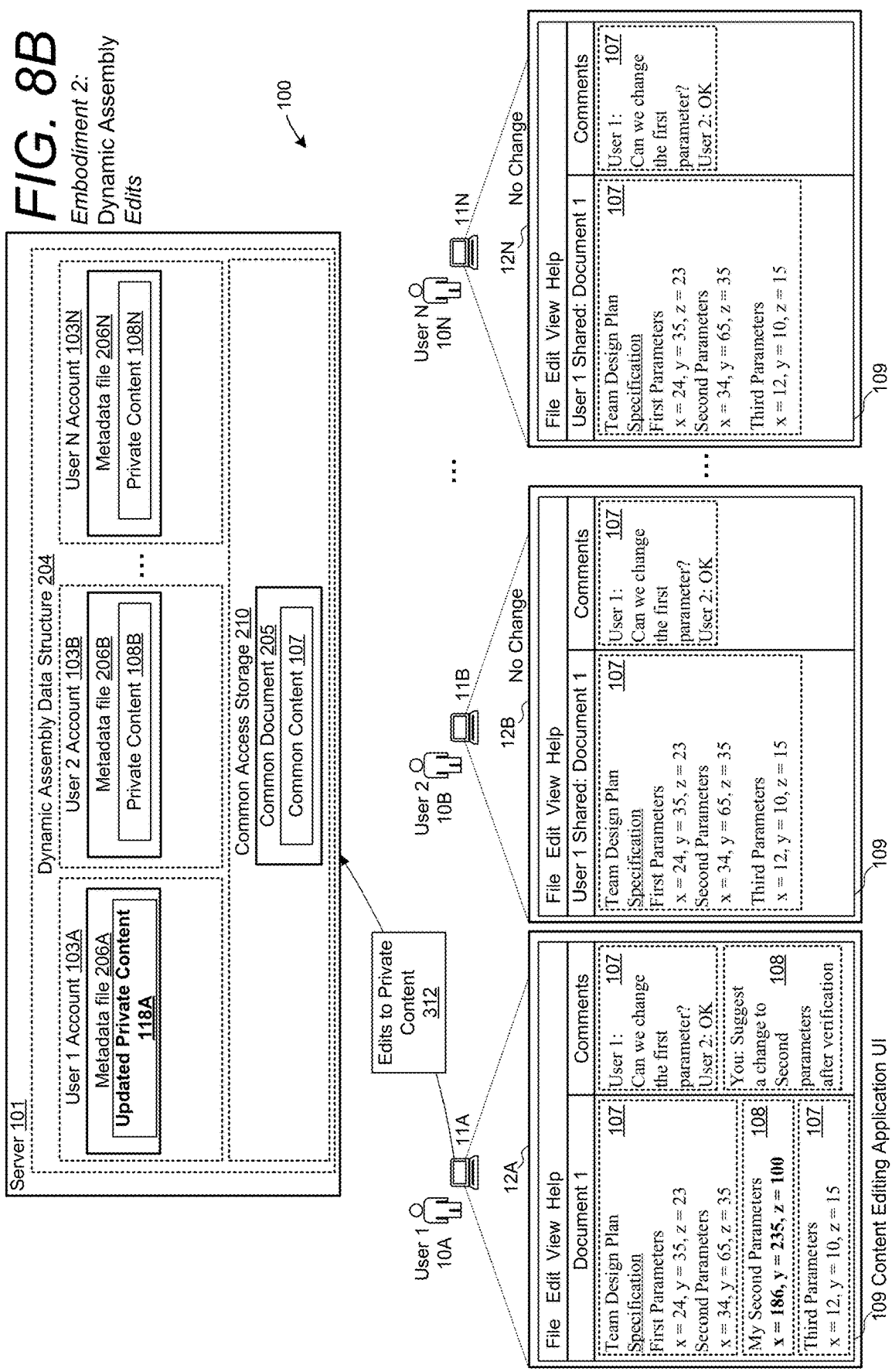

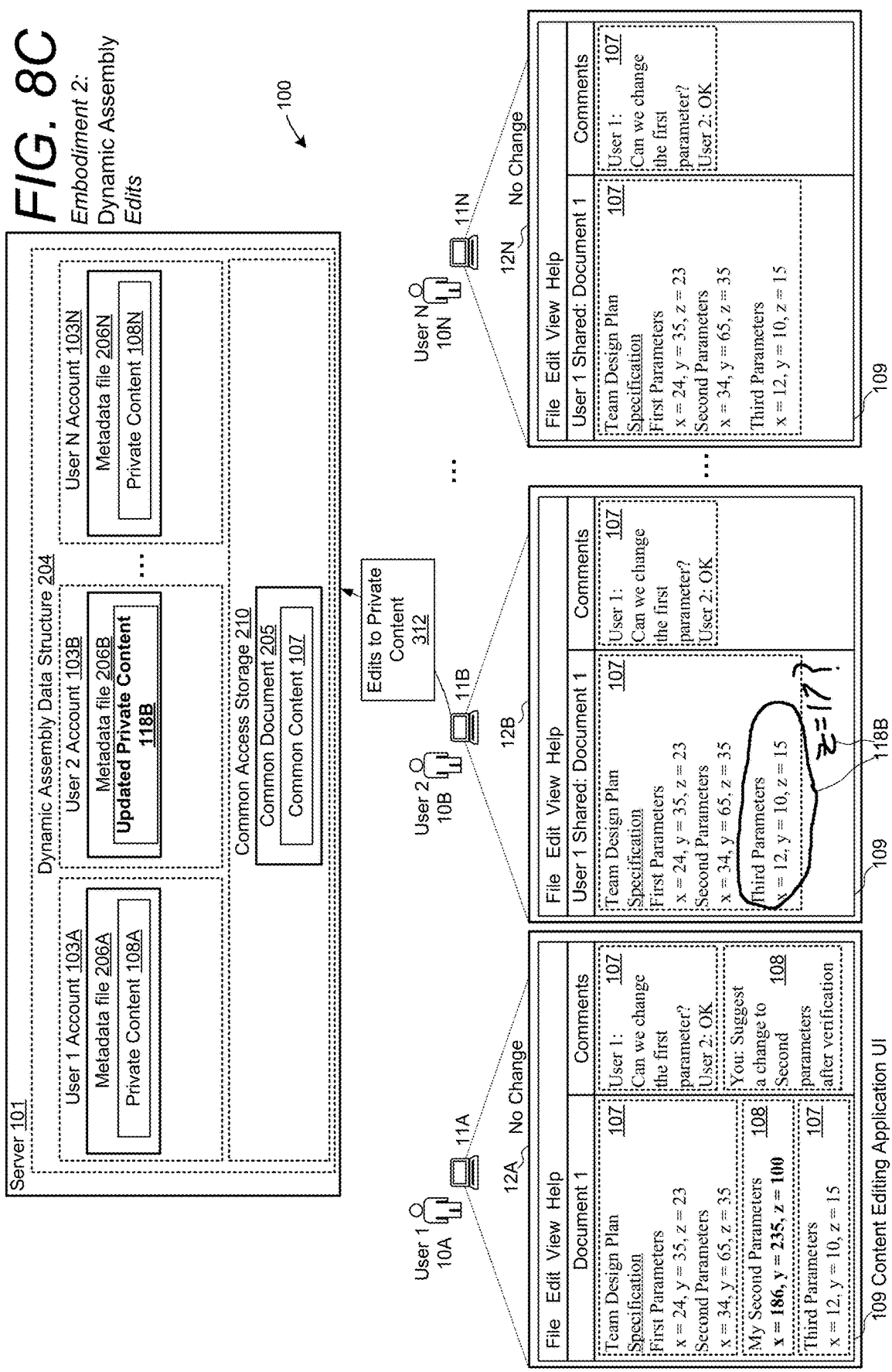

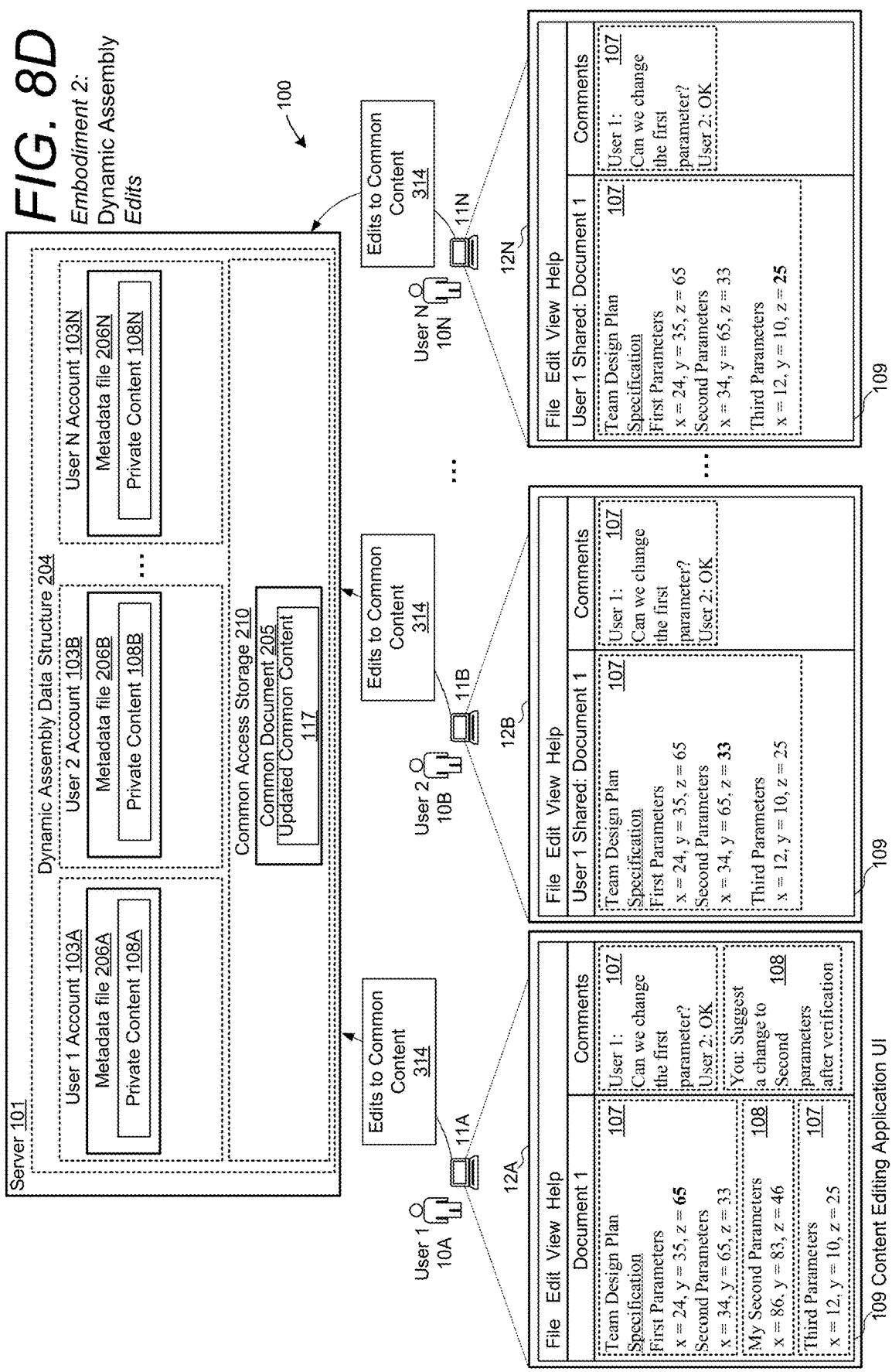

ENHANCED SECURITY FEATURES FOR CONTROLLING ACCESS TO SHARED CONTENT AND PRIVATE CONTENT OF A SHARED DOCUMENT

BACKGROUND

Computer users can share documents using a number of different mechanisms. For instance, a user can share a document with multiple users via email, shared storage drives, multi-user editing systems, etc. Users receiving the shared document can then provide edits, which in turn can be shared with other users.

Although existing systems provide features that allow users to edit and share documents, some systems can create a number of inefficiencies and security issues. For illustrative purposes, consider a scenario where a user wishes to share a document with team members but also wishes to maintain private notes for that document. In such scenarios, the user may have to create two documents: one copy that may be shared with others and another copy that contains the private notes. This solution may create security issues in that the user may inadvertently send the private version of the document to others.

Some existing solutions can also create a number of inefficiencies with respect to data storage and management of files. The storage of two files may cause a need to use computing resources to unnecessarily duplicate the storage of some data. In addition, a number of other processing inefficiencies may be created in the fact that the user may be required to update both documents as shared content is updated. This can also create other inefficiencies given that a user may have to duplicate data entry efforts. This additional input caused by the maintenance of two files can increase the probability of an inadvertent inputs and other errors which can lead to data integrity issues, version control issues, file discoverability and association issues, etc.

SUMMARY

The techniques disclosed herein provide enhanced security features for controlling access to shared content and private content of a document. A system can enable multiple users to access a common content file, such as a Word document or a PowerPoint file. For illustrative purposes, content shared between multiple users can be referred to herein as common content and each user having appropriate permissions can view and edit the common content. Each user can add additional private content unique to each individual user. Private content associated with a particular user is restricted from being shared with any other user. The added private content can be positioned within a content body of a file, within a comment or notes section of a file, or positioned within any other section of a file that is outside the body of the document. The private content can be integrated in these sections of a document with or without common content. Thus, when a first user opens a file authored and/or owned by other users stored in a cloud storage service, the system allows that first user to see the common content that is shared by the other users plus private content that is unique to the first user, but not allow the first user to view other private content provided by the other users. Multiple users can access the same common content file at the same time. Each user will be able to view the same common content plus each user's respective private content.

In one example process, a first user can generate or edit a document. They system can provide an option for adding private content, which can include text, images, etc. This private content can be embedded in the body of document or a comment section. The private content may be selected by a voice command, an input gesture or any other input selecting content or generating new content. For example, a document author can highlight the text of a document body or a comment to designate that content as private content. Several embodiments disclosed herein can be used to enable a server to provide granular control over private content and common content within a shared document.

In one embodiment, a system generates two files: (1) a parent file including private content and non-private content and (2) a child file, which can include everything in the parent file excluding private content. In some configurations, non-private content, can be the common content that is selected for sharing with one or more remote user other than file owner or author. During operation, the child file, having non-private content only, is the default version for public use. Public use of a file can include sharing methods such as, but not limited to, SharePoint, email attachments, IM share, screen/app sharing in Teams, and text. On the other hand, when a user, e.g., the file owner or content author, accesses the document, the system confirms their identity and based on an identify verification, the system delivers the parent file, having the private content and the non-private content to that user. When that user edits the parent file, the system propagates those changes to the common content in the child file. A setting, which may include a default setting or group policy, can enforce that only child files are downloaded by users other than the file owner. The parent file can be downloaded depending on device used, e.g., whether it has Azure Device Management installed or not. When other users update the child document, those changes are propagated to the parent file thus providing the updated content to the file owner via the propagation to the parent file.

In another embodiment, the system utilizes a dynamic assembly feature that enables a system to control access to private content and common content of a file. In a cloud system, each user is associated with a unique user ID. When a user provides an input to save content, the server creates a common document. For each common document, the system creates a unique metadata file associated with each user ID. The unique metadata file includes a key to a common content file; and (2) a key to any private metadata file corresponding to each common content file. When User A accesses or edits a common content file, based on the user ID of User A, the system retrieves the common content file and retrieves the metadata file corresponding to User A. According to the private metadata file corresponding to the common content file, the system delivers a personalized version of the common content file to User A by incorporating the private metadata file to the common content file. As a result, User A can see all the private contents User A added to the common content. When User A adds non-private content to the common content, the added non-private contents roll into the common content file. When User A add private content to the common contents, the added private contents are included in the private metadata file of User A, but not the common content file.

In continuing the above example, if a different user, User B, tries to access the common content file, the same operation applies where the system retrieves the common content file and retrieves the metadata file corresponding to User B based on User B's user ID. The system then conveys a personalized version of the common content to User B by incorporating the private metadata file to the common content file. As a result, User B can see all the private contents User B added to the common content, but not the private content created by User A. In some configurations, the system can use a multi-key to provide multi-access privileges to the files. The system can also use a User ID to specifically make a comment visible to a person or a specific group and not others.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

FIG. 1 is a block diagram of a system for providing enhanced security features for controlling access to shared content and private content of a document.

FIG. 2C is a block diagram of a system and user interface for sharing common content while restricting the display of private content.

FIG. 2E is a block diagram of a system and user interface for a second user to edit common content.

FIG. 3A is a block diagram of a system and user interface for displaying shared content while restricting the display of private content.

FIG. 3B is a block diagram of a system and user interface for allowing a first user to update private content while restricting the display of that private content to other users.

FIG. 4 is a block diagram of a system utilizing metafiles and a user interface for providing enhanced security features for controlling access to shared content and private content.

FIG. 5B is a block diagram of a system and user interface for selecting content to be designated as private content for a user.

FIG. 6C is a block diagram of a system and a corresponding user interface for displaying shared content and private content utilizing a dynamically assembled file.

FIG. 7A is a block diagram of a system illustrating aspects of a request from a secondary user for accessing stored data.

FIG. 7B is a block diagram of a system illustrating aspects of a process for generating a dynamically assembled file for secondary user.

FIG. 7C is a block diagram of a system and user interfaces for displaying shared content and private content utilizing a dynamically assembled file.

FIG. 8B is a block diagram of a system and user interface for a first user providing edits to private content stored within a dynamic assembly data structure.

FIG. 8C is a block diagram of a system and user interface for a second user providing edits to private content stored within a dynamic assembly data structure.

FIG. 8D is a block diagram of a system and user interface for providing edits to common content stored within a dynamic assembly data structure.

DETAILED DESCRIPTION

Figure 2A:
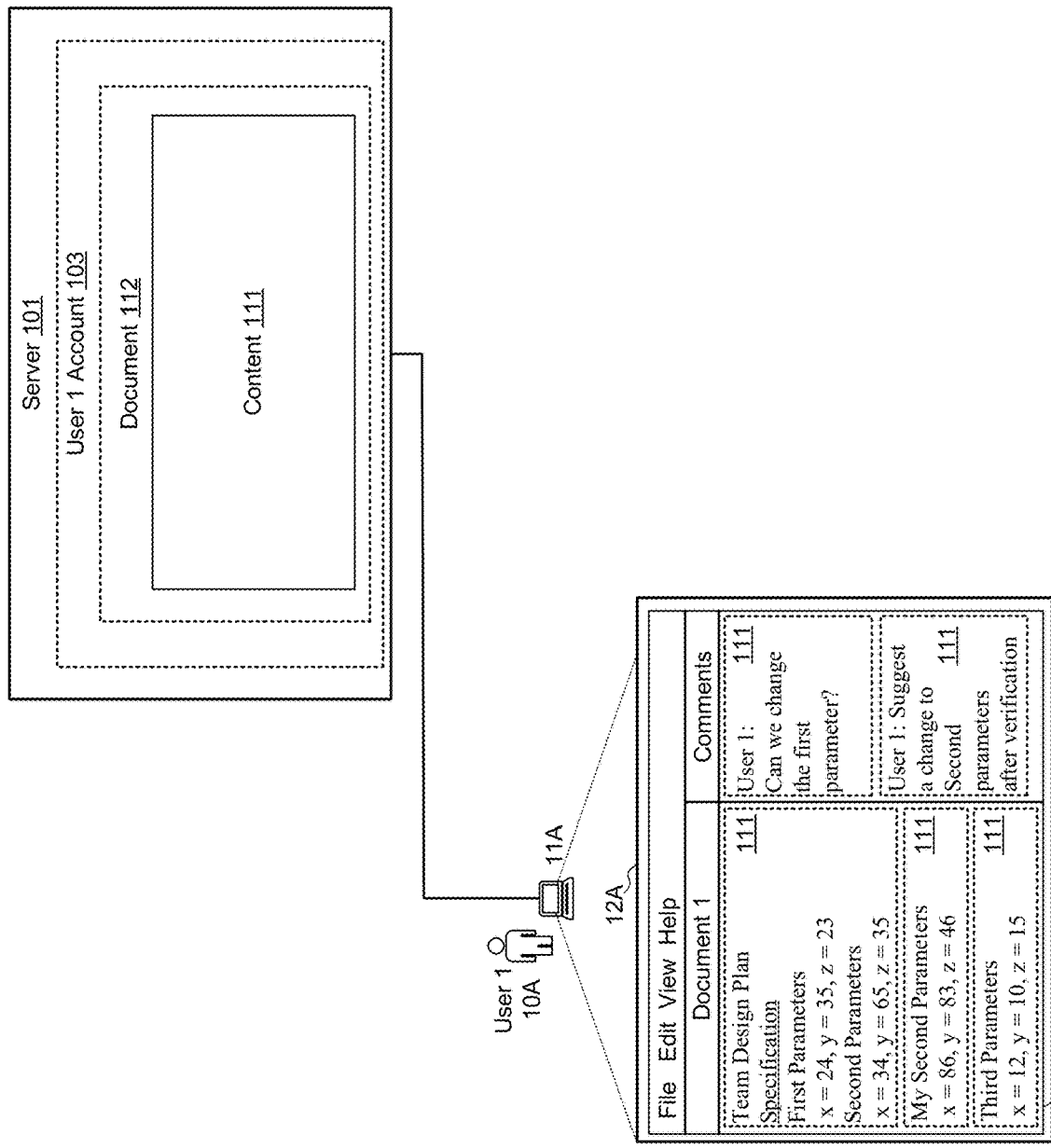
FIG. 2A is a block diagram of a system and user interface for interacting with a document.

FIG. 1 is a block diagram of a system 100 and an example user interface for providing enhanced security features for controlling access to shared content and private content of a document. This example user interface can be displayed to a number of users 10 of a communication session. Each device 11 can individually display a user interface 101 comprising common content 107 and private content 108. The private content in this example is only displayed to the first user 10A of a number of users, while also allowing the other users 10B-10N to view the common content 107, which is also referred to herein as shared content. Each user 10 is associated with an individual computer 11 which each generate a user interface arrangement 12 comprising a content editing user interface 109. For instance, the first user 10A has credentials to operate the first computer 11A which in turn generates first user interface arrangement 12A having a content editing user interface 109. The second computer 11B displays a second user interface arrangement 12B having a content editing user interface 109, and the system does the same up to the Nth user.

In some configurations, the system can virtualize a common document using child and parent documents. This can include a data structure 104 having a parent file 105 with private content 108 and common content 107 and a child file 106 has only common content 107. In this example, a first user 10A, User 1, has an associated account 103 on a server 101. The first user shares a document with other users 10B-10N. The data structure 104, also referred to herein as a virtualize document 104, can be generated as a new document or the data structure 104 can be generated from an existing document. For instance, in the transition from FIG. 2A to FIG. 2B, a user can start with a standard document 112 that contains content 111. The user can then provide input data 715 that can identify selected content that is to be designated as private content 108. In the example shown in FIG. 2B, the system can utilize any process that can identify and distinguish private content 108 from common content 107. In this example, the user designates some text of a document as private content. Thus, in some configurations, the system can receive input data 715 from a first user for invoking the generation of a data structure 104 configured to control access to the private content 108 associated with common content 107, wherein the input data identifies the private content 108 and at least one file 112, 105 storing the common content 107.

Figure 2B:
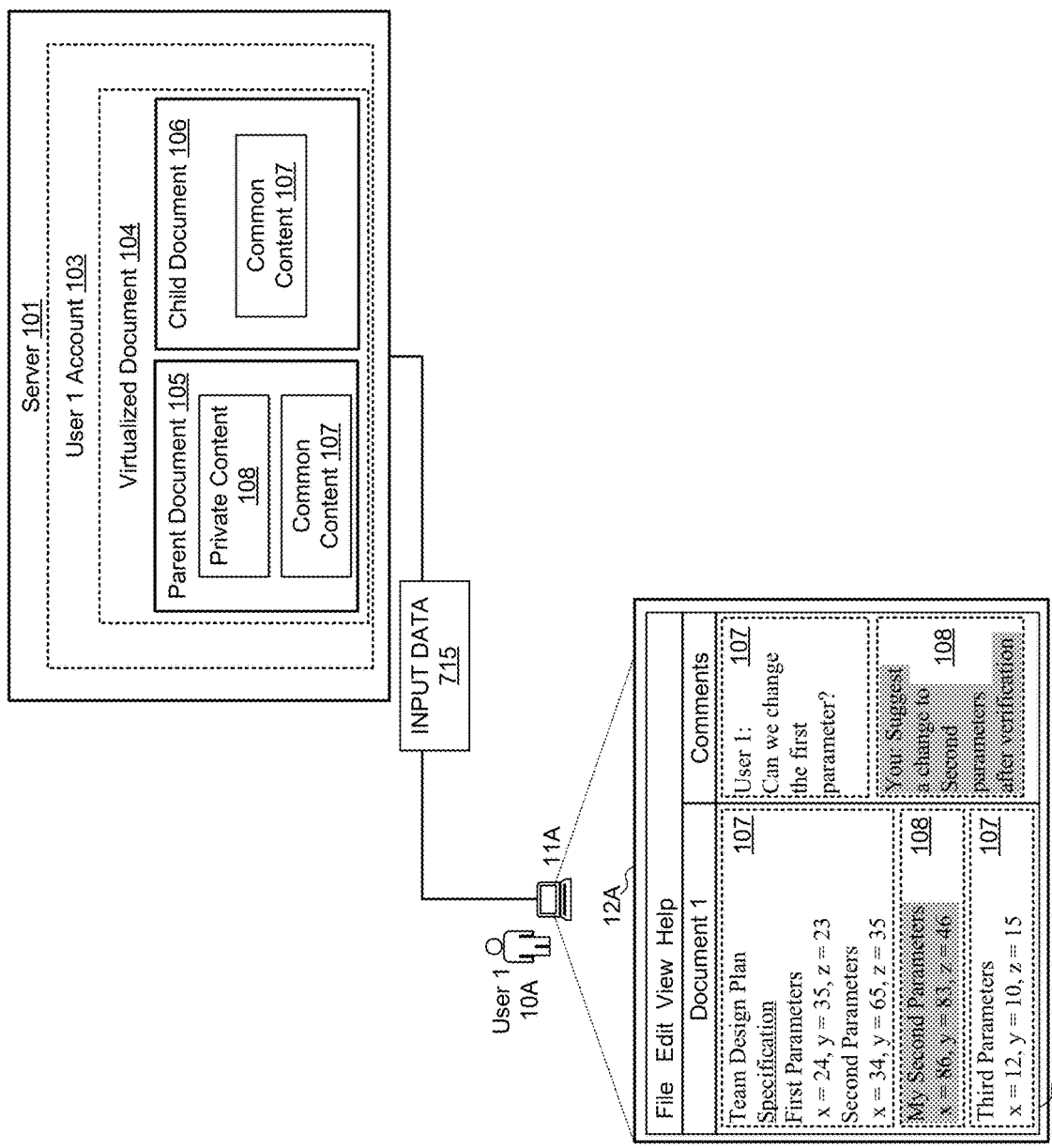
FIG. 2B is a block diagram of a system and user interface for selecting content to be designated as private content for a user.
Figure 11:
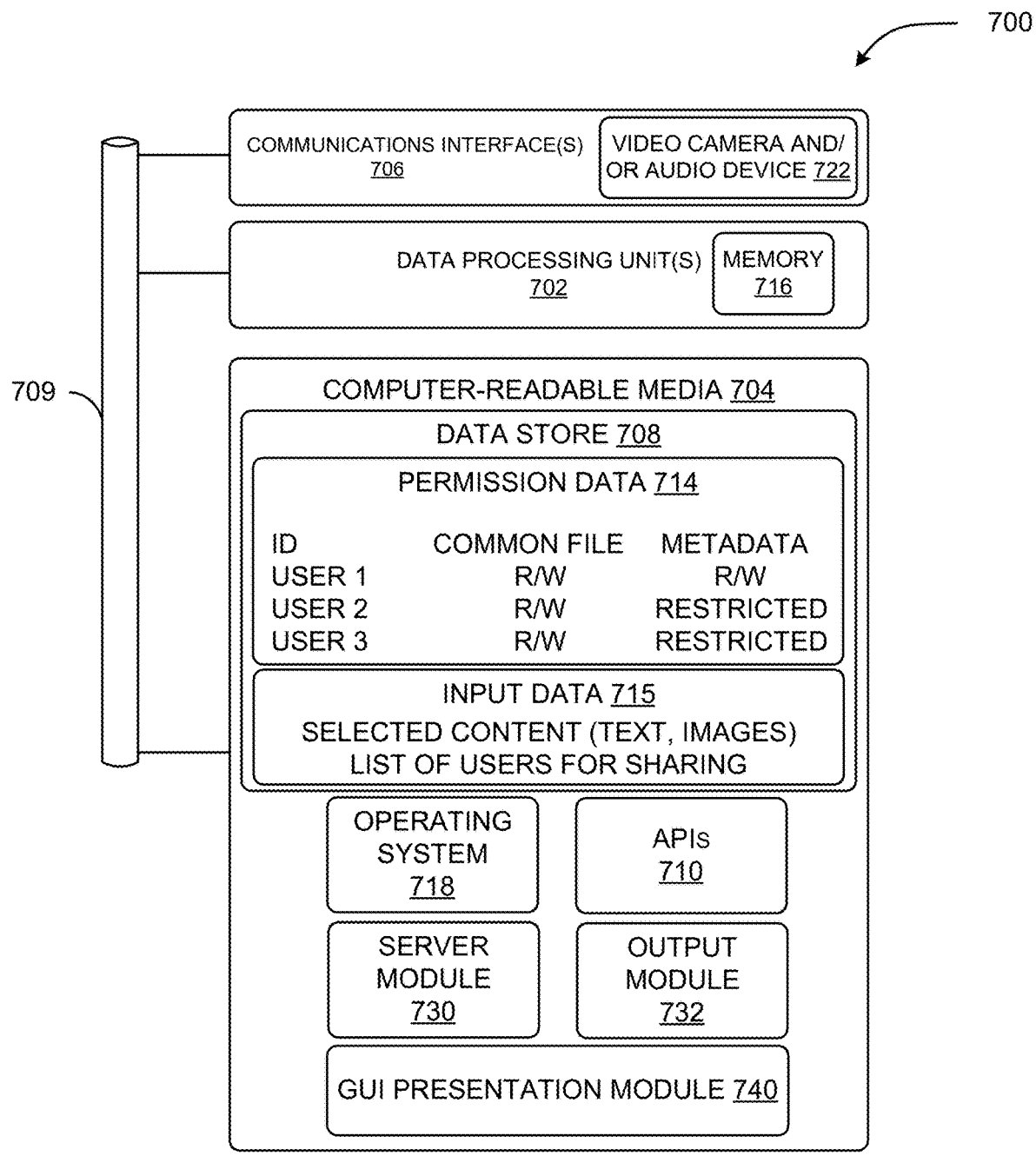
FIG. 11 is a computer architecture diagram illustrating a computing device architecture for a computing device capable of implementing aspects of the techniques and technologies presented herein.

As shown in FIG. 2B, the system can generate a data structure comprising a parent file and child file in response to receiving the input data 715. The system can also update permissions in response to receiving the input data 715. In this example, the system generates a data structure 104 comprising a parent document 105 and a child document 106 in response to receiving the input data 715 identifying the private content 108. The child document comprises the common content and excludes the private content. The parent document comprises the common content and the private content. In response to the input, the permission data, which is shown in FIG. 11, is configured to allow the first user 10A to access and modify the common content and the private content of the parent document 105. The permission data can also associate the parent document 105 to the first user. The permission data can also be configured to restrict other users from accessing the common content and the private content of the parent document 105.

As shown in FIG. 2C, the first user provides other users 10B-10N with access to the child document, e.g., allowing access on a server, emailing the document, etc. Although this example illustrates a copy of the file being stored in a cloud, it can be appreciated that the document can be communicated to any computing device and stored on any other device that receives the file or data structure 104. The input data can identify other users and provide the other users access to the child document 106. The access allows the other users to modify the common content of the child document and not allow the other users to modify the common content 107 of the parent document 105.

Figure 2D:
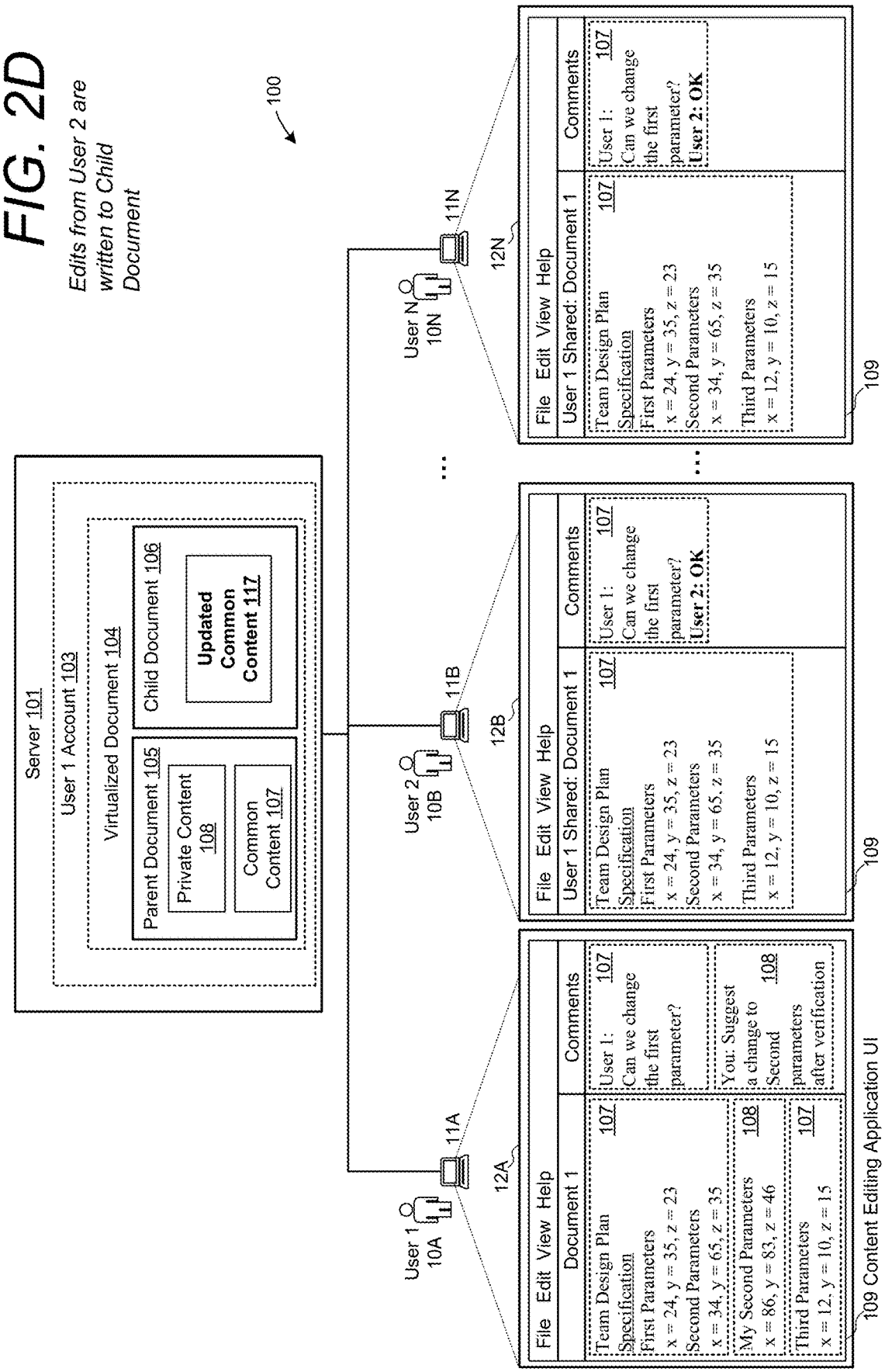
FIG. 2D is a block diagram of a system and user interface for a first user to edit common content.

FIG. 2D shows an example scenario where edits are received from another user other than the file owner, such as the second user 10B, User 2. In this example, the second user provides an edit to the comment section, which is designated as common content. In response to this input, the system receives other input data from the second user. The other input data indicates modifications to the common content of the child document. In this example, the edit may just include the new text, new formatting, and new images, changes to existing content, etc.

As shown in FIG. 2E, in response to the input from the second user, the system can modify the content of the child document 106 thereby creating updated common content 117 in the child document 106. Also shown, in response to any updates received at the child document, the system can propagate the changes of the child document to the parent document 105. The parent document 105 is owned by the first user. In some configurations, when the child document 106 is updated with a modification to create updated common content 117, those changes can be displayed on the devices 11N of other users, such as the Nth user.

In response to the updated common content 117 being propagated to the parent doctor 105, the view of the virtualize document 104 at the first computer associated with the first user 10A is updated. The system 100 can restrict the propagation such that the propagation is only executed in response to verifying that the child document 106 is linked to the parent document 105, and when the parent document 105 associated with the first user 10A is configured to enable a concurrent display of the private content 108 and the modified common content 117 of the parent document 105 on a display device 629 associated with the first user 10A. Thus, if the second user is no longer authorized to view or edit the virtualized document, the propagation caused by a modification of a second user is not executed.

Referring now to FIG. 3A and FIG. 3B, an example of the first user editing private content is shown and described. In this example, the edits provided by the first user to private content is only applied to the parent document when the first user has appropriate permissions for writing to that section of the virtualize document 104. In this example, the first user provides an edit to private content 108, e.g., the user changes parameters. In response to this input, the system receives additional input data from the first user indicating modifications to the private content 108 associated with an account of the first user 10A. In response to the input, the system generates updated private content 118 by applying the modifications of the additional input data to the private content 108 in the parent document 105, wherein the updated private content 118 is only generated in response to verifying that the permissions of the first user 10A allow the first user to modify the parent document. In this example, the permission data restricts the other users 10B-10N from accessing the updated private content 118.

When the first user edits the common content, edits are applied to the child document and propagated to the parent. Thus, in this scenario, when the system receives additional input data from the first user indicating modifications to the common content of the child document 106, the system can generate updated common content 117 by applying the modifications of the additional input data to the common content. With reference to FIGS. 2D and 2E, modifications made by the first user to the common content, are made to the common content of the child document 106. The system then propagates the updated common content 117 from the child document 106 to the parent document 105.

In another example, when the first user edits the common content, edits can be applied to the parent document. In this embodiment, edits that are applied to the common content of the parent document are then propagated to the child document thereby creating updated common content in the child document 106. Thus, in this example, in response to receiving additional input data from the first user indicating modifications to the common content of the parent document 105, the system can generate updated common content 117 by applying the modifications of the additional input data to the common content of the parent document 105. The system then propagates the updated common content 117 from the parent document 105 to the child document 106.

In another example, when other users, e.g., User 2-User N, add private content to the file of the first user, that private data can be stored in the private content of the first user's parent document. In such embodiments, the system can receive additional input data from a second user of the other users, where the additional input data includes additional private data that has a controlled access only allowing access to the second user. In such embodiments, in response to this input, the system stores the additional private data in the parent document. The system also configures the permission data so that the system only enables the second user to view and edit the additional private data. the permission data also restricts the first user from to view or modifying the additional private data.

In some configurations, the permission data associates the parent document to the child document, and the parent document and the child document are stored within a storage device under the control of an account owned by the first user. The permission data can only be modified by a configuration input by the first user, who in this example is the owner of document 104. The first user can then control access of the other users to the child document.

In some configurations, the input data provided by the first user includes identities of the other users, e.g., User 2-User N. In this case, the input data causes the configuration of the permission data to allow one or more computers of the other users to access the common content of the child document, and access enables the one or more computers of the other users to receive the common content of the child document and modify the common content of the child document.

Referring now to FIG. 4, embodiments disclosed herein enable enhanced access control for private content and shared content by the use of a dynamic assembly data structure 204. In this example, when a user, such as the first user, shares content of a document, the system generates a data structure 204 that includes a common document 205 that comprises common content 107. The common document 205 can be stored with permissions that allow each user designated by the file owner to access the contents of the common document 205. In this example, the comment document 205 is stored in a common access storage 210 that is configured with permissions that each user designated by the first user to read and write content to the common document 205. In this example, the data structure also includes metadata files 206 that are generated for each user identity. As will be described in further detail below, the system utilizes this data structure to generate a dynamically assembled file that allows users to view and modify common content 107 and private content 108.

Figure 5A:
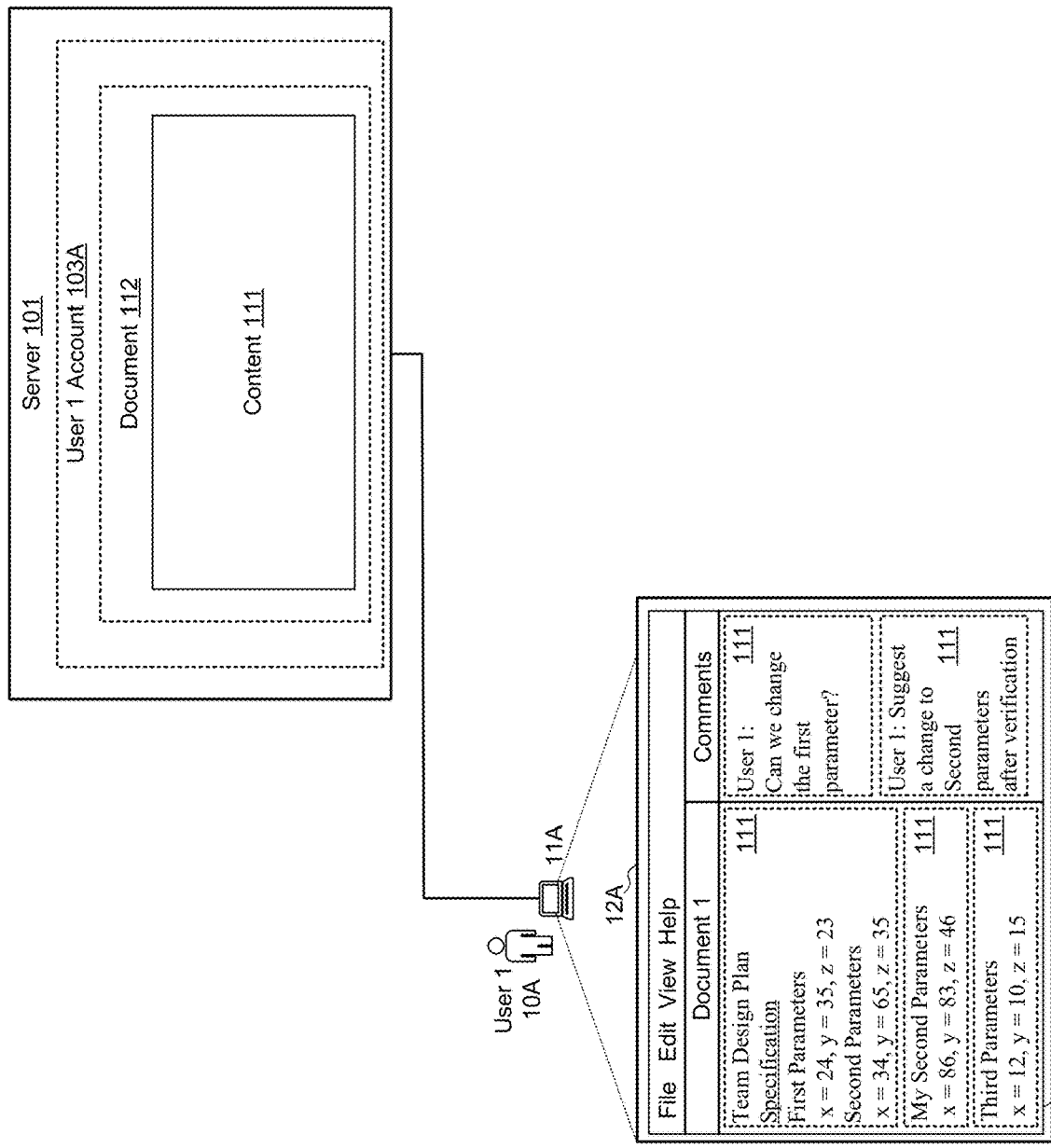
FIG. 5A is a block diagram of a system and user interface for interacting with a document.

As shown in FIG. 5A, a first user 10A can start with a standard document 112 having content 111. The content can be displayed on a content editing application user interface 109. As shown in FIG. 5B, the first user can designate or select private content within the document. In this example, the user highlights some of the content 111 to distinguish that content as private content 108. Thus, the system can receive input data 715 from a first user 10A for invoking the generation of a data structure 204 configured to control access to the private content 108A associated with common content 107, wherein the input data identifies the private content 108A and at least one file 112, 205 for the retrieval of the common content 107.

In response to this input, the system generates the data structure, which can include the common document 107 and metadata files for each participant, where the metadata files 206 include private content for each respective user. For example, private content 108A is content that is selected or generated by the first user and is only viewable by the first user. Private content 108B is content that is selected or generated by the second user and it only viewable by the second user. In some configurations, the system can generate a data structure 104 comprising a common document 205 and a plurality of metadata files 206A-206N in response to receiving the input data identifying the private content 108A. The common document comprises the common content 107 and excludes the private content 108A. As shown, a first metadata file 206A is associated with the first user 10A and other individual metadata files 206B-206N are each associated with other individual users 10B-10N.

In response to the input, permission data 714 can be configured to allow the first user to access and modify the common content 107 of the common document 205 and access and modify the private content of the first metadata file 206A. The permission data 714 can also be configured to restrict the individual users 10B-10N from accessing the private content 108A of the first metadata file 206A. The permission data 714 can also be configured to allow the other individual users 10B-10N to access the individual metadata files 206B-206N respectfully owned by the individual users 10B-10N.

Figure 6A:
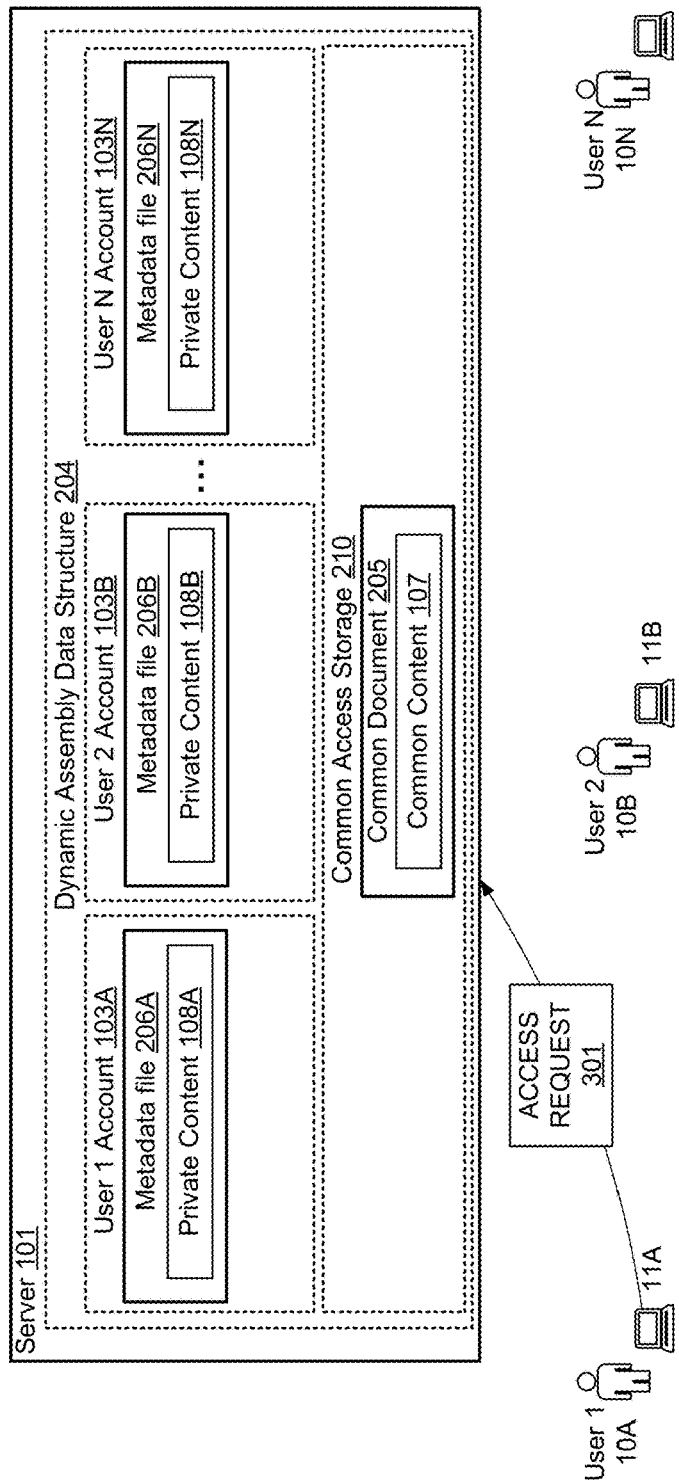
FIG. 6A is a block diagram of a system illustrating aspects of a request for accessing stored data.
Figure 6B:
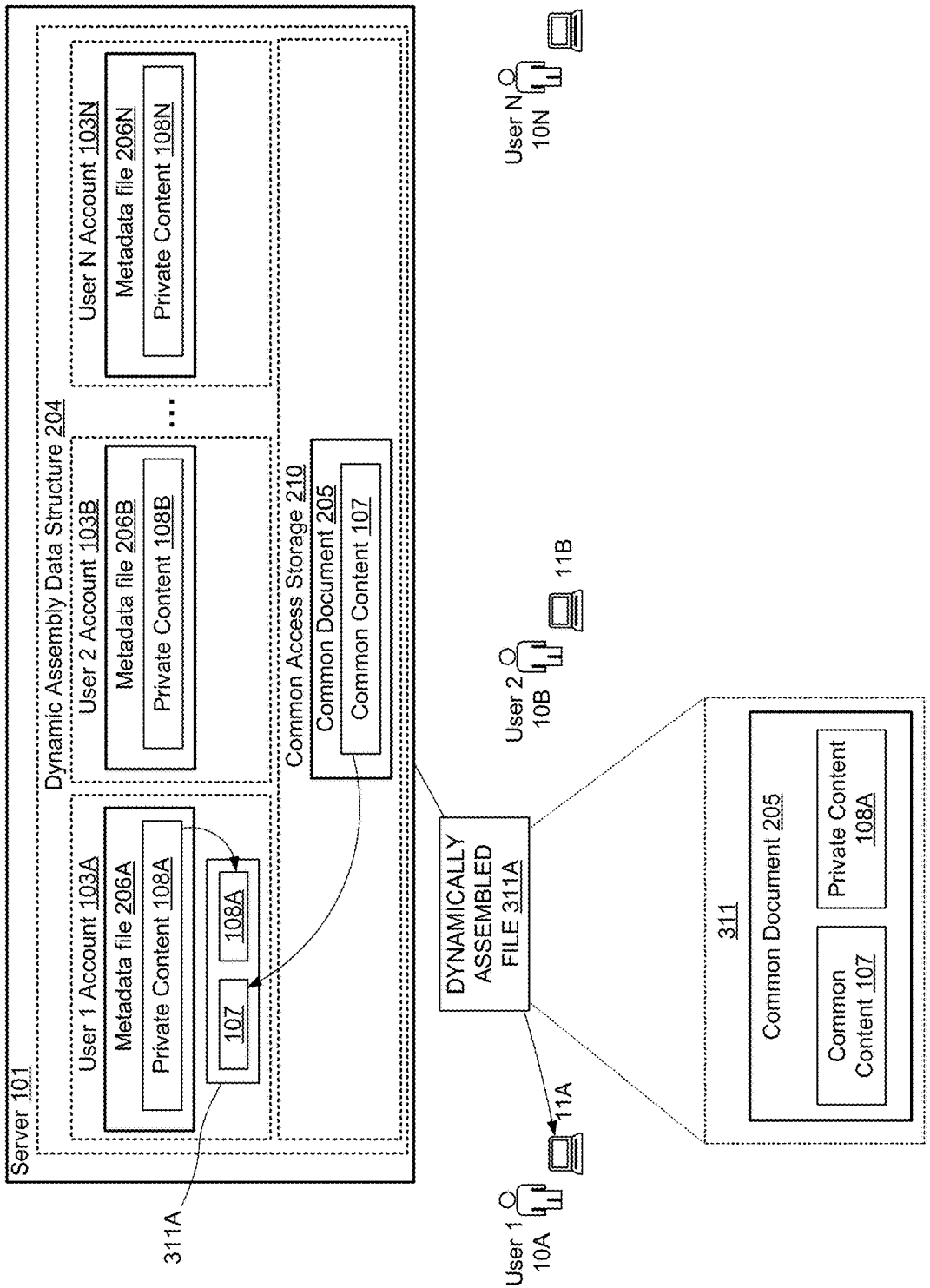
FIG. 6B is a block diagram of a system illustrating aspects of a process for generating a dynamically assembled file.

Referring now to the examples of FIGS. 6A and 6B, system can generate and deliver personalized version of the common content file to a user, such as User A, by incorporating the private metadata file to the common content file. In this example, as shown in FIG. 6A, in response to a request 301 to access, e.g., view and/or modify, the common content 107 and the private content 108A, the system generates a dynamically assembled file 311A. The generation of the dynamically assembled file 311A comprises retrieving the common content 107 from the common document 205 and retrieving the private content 108A from the first metadata file 206A and integrating the private content 108A from the first metadata file 206A into the dynamically assembled file 311 with the common content 107.

As shown in FIGS. 6B and 6C, the system communicates the personalized version of the file to cause a display of the file on the requesting user, e.g., User 1. In this example, the system communicates the dynamically assembled file 311A to at least one computing device 11A causing a display of the private content 108A associated with the first user 10A concurrently with the common content 107 retrieved from the dynamically assembled file 311 on the at least one computing device 11A. The communication of the dynamically assembled file 311A is restricted from transmission to computing devices, e.g., devices 11B-11N, other than the at least one computing device 11A associated with the first user 10A.

As shown in FIGS. 7A and 7B, other users, such as a second user, access the file for viewing and editing. In this example, in response to an access request 301 from the second user, the system generates a second dynamically assembled file 311B. More specifically, this generation may be in response to a request from a second user 10B to access the common content 107. The generation of the second dynamically assembled file 311B can include operations for retrieving the common content 107 from the common document 205 and retrieving private content 108B from the second metadata file 206B and integrating the private content 108B from the second metadata file 206B into the second dynamically assembled file 311B with the common content 107. As shown in FIG. 7C, the system can then communicate the second dynamically assembled file 311B to a second computing device 11B causing a display of the private content 108B associated with the second user 10B concurrently with the common content 107 retrieved from the second dynamically assembled file 311B on the second computing device 11B. The communication of the second dynamically assembled file 311B is restricted to communication to the second computing device 11B associated with the second user 10B. Thus, other users, such as the first user or the Nth user cannot access the dynamically assembled file 311B.

Figure 8A:
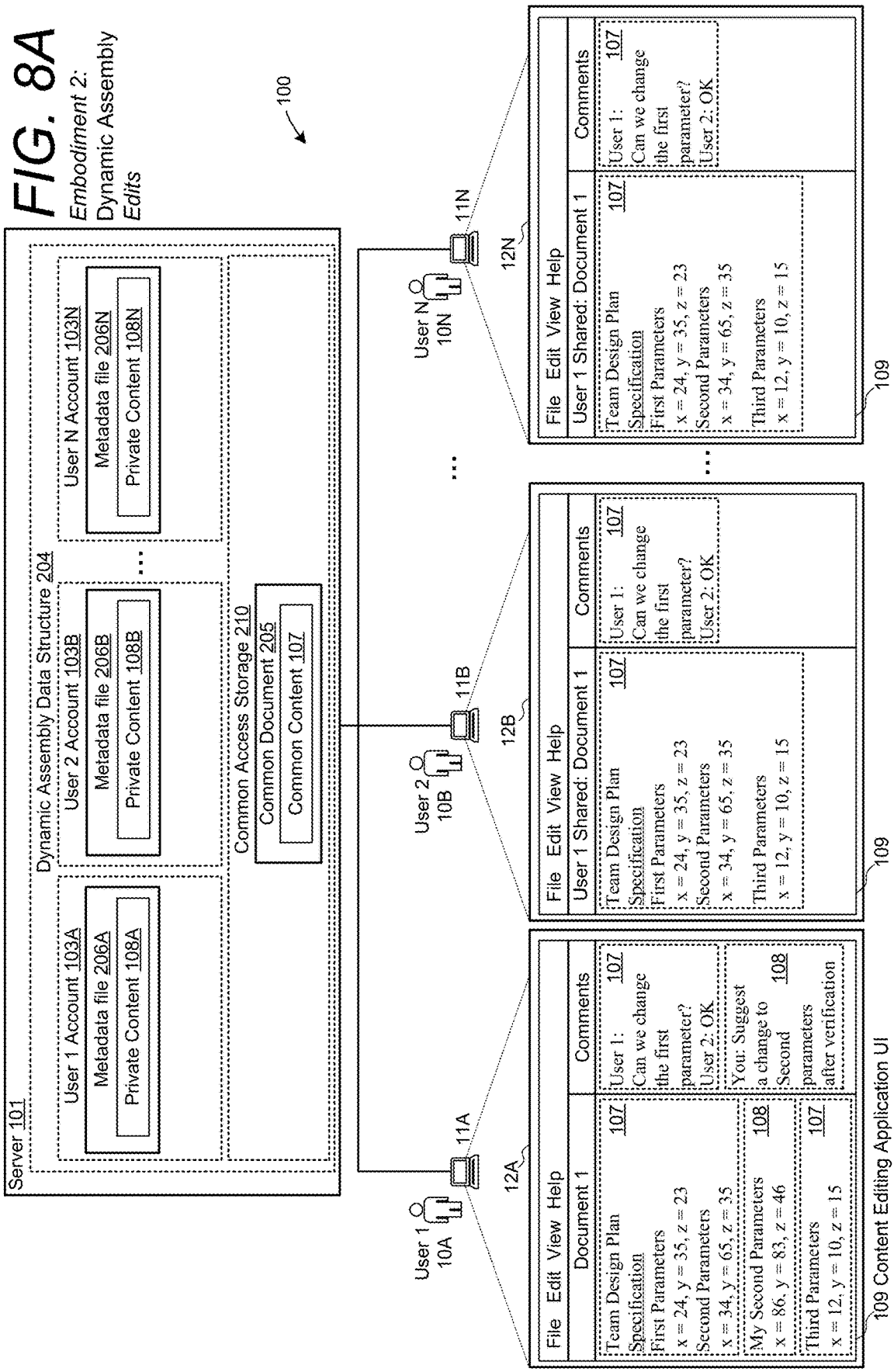
FIG. 8A is a block diagram of a system utilizing metafiles and a user interface for providing enhanced security features for controlling access to shared content and private content.

FIG. 8A through FIG. 8D illustrate an example of various editing scenarios. As shown in FIG. 8A, each user can view the common content 107 and their respective private content in a first date. Then as shown in FIG. 8B, the first user provides edits to his or her private content. In this embodiment, the server receives additional input data 312 from the first user indicating modifications to the private content 108A associated with the first user 10A. In response to that input, the system generates updated private content 118A by applying the modifications of the additional input data to the private content 118 of the first metadata file 206A. The updated private content 118A is stored within the first metadata file 206A, and the updated private content 118A is only generated in response to verifying that the permissions of the first user 10A allow the first user to modify the first metadata file 206A. Thus, the system restricts access to the private content the first metadata file 206A for any other user other than the first user. The permission data restricts computers of other users 10B-10N from accessing the updated private content 118A stored within the first metadata file 206A.

As shown in the example of FIG. 8C, when the second user edits his or her private content, the system provides updates to the second metadata file 206B. In this example, the system receives additional input data 312 from a second user 10B indicating modifications to the private content 108B associated with the second user 10B. The system then generates updated private content 118B for the second user 10B by applying the modifications of the additional input data to the private content 118B of the second metadata file 206B. The updated private content 118B is stored within the second metadata file 206B, and the updated private content 118B is only generated in response to verifying that the permissions of the second user 10B allow the second user to modify the second metadata file 206B. Thus, the permission data restricts the first user and other users 10A and 10N from accessing the updated private content 118B stored within the second metadata file 206B.

In the example of FIG. 8C, the first user edits the common content. In this scenario, the system receives additional input data 314 from the first user indicating modifications to the common content 107. In response to this input, the system generates updated common content 117 by applying the modifications of the additional input data 314 to the common content 107 of the common document 205. The updated common content 117 is stored within the common document 205, wherein the updated common content 117 is only generated in response to verifying that the permissions of the first user 10A allow the first user to modify the common document 205. The permission data restricts a modification of the private content 108A stored within the first metadata file 206A based on the input data 314 indicating the modification to the common content 107.

In some configurations, the permission data associates the first metadata file 206A with a first user account 103A. The permission data can also associate the common document with a common access storage area 210. The permission data can also control the users that may access the common access storage area 210. The permissions of the common access storage area 210 can be modified by a user that generated the common document 205, e.g., the document owner. The permission data can also restrict a second user from accessing the first metadata file that is associated with the first user account.

In some configurations, the input data 715 includes identities of the other users, wherein the input data causes the configuration of the permission data to allow one or more computers of the other users to access the common content of common document 205. The granted access enables the one or more computers of the other users to receive the common content of the common document and modify the common content of the common document.

FIG. 13 illustrates a diagram that shows example components of an example device 700 (also referred to herein as a "computing device") configured to generate data for some of the user interfaces disclosed herein. The device 700 may generate data that may include one or more sections that may render or comprise video, images, virtual objects, and/or content for display on the display screen 629. The device 700 may represent one of the device(s) described herein. Additionally, or alternatively, the device 700 may represent one of the client computing devices 606.

As illustrated, the device 700 includes one or more data processing unit(s) 702, computer-readable media 704, and communication interface(s) 706. The components of the device 700 are operatively connected, for example, via a bus 709, which may include one or more of a system bus, a data bus, an address bus, a PCI bus, a Mini-PCI bus, and any variety of local, peripheral, and/or independent buses.

As utilized herein, data processing unit(s), such as the data processing unit(s) 702 and/or data processing unit(s) 692, may represent, for example, a CPU-type data processing unit, a GPU-type data processing unit, a field-programmable gate array ("FPGA"), another class of DSP, or other hardware logic components that may, in some instances, be driven by a CPU. For example, and without limitation, illustrative types of hardware logic components that may be utilized include Application-Specific Integrated Circuits ("ASICs"), Application-Specific Standard Products ("ASSPs"), System-on-a-Chip Systems ("SOCs"), Complex Programmable Logic Devices ("CPLDs"), etc.

As utilized herein, computer-readable media, such as computer-readable media 704 and computer-readable media 694, may store instructions executable by the data processing unit(s). The computer-readable media may also store instructions executable by external data processing units such as by an external CPU, an external GPU, and/or executable by an external accelerator, such as an FPGA type accelerator, a DSP type accelerator, or any other internal or external accelerator. In various examples, at least one CPU, GPU, and/or accelerator is incorporated in a computing device, while in some examples one or more of a CPU, GPU, and/or accelerator is external to a computing device.

Computer-readable media, which might also be referred to herein as a computer-readable medium, may include computer storage media and/or communication media. Computer storage media may include one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random access memory ("RAM"), static random-access memory ("SRAM"), dynamic random-access memory ("DRAM"), phase change memory ("PCM"), read-only memory ("ROM"), erasable programmable read-only memory ("EPROM"), electrically erasable programmable read-only memory ("EEPROM"), flash memory, compact disc read-only memory ("CD-ROM"), digital versatile disks ("DVDs"), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device. The computer storage media can also be referred to herein as computer-readable storage media, non-transitory computer-readable storage media, non-transitory computer-readable medium, or computer storage medium.

In contrast to computer storage media, communication media may embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

Communication interface(s) 706 may represent, for example, network interface controllers ("NICs") or other types of transceiver devices to send and receive communications over a network. Furthermore, the communication interface(s) 706 may include one or more video cameras and/or audio devices 722 to enable generation of video feeds and/or still images, and so forth.

In the illustrated example, computer-readable media 704 includes a data store 708. In some examples, the data store 708 includes data storage such as a database, data warehouse, or other type of structured or unstructured data storage. In some examples, the data store 708 includes a corpus and/or a relational database with one or more tables, indices, stored procedures, and so forth to enable data access including one or more of hypertext markup language ("HTML") tables, resource description framework ("RDF") tables, web ontology language ("OWL") tables, and/or extensible markup language ("XML") tables, for example.

Figure 10:
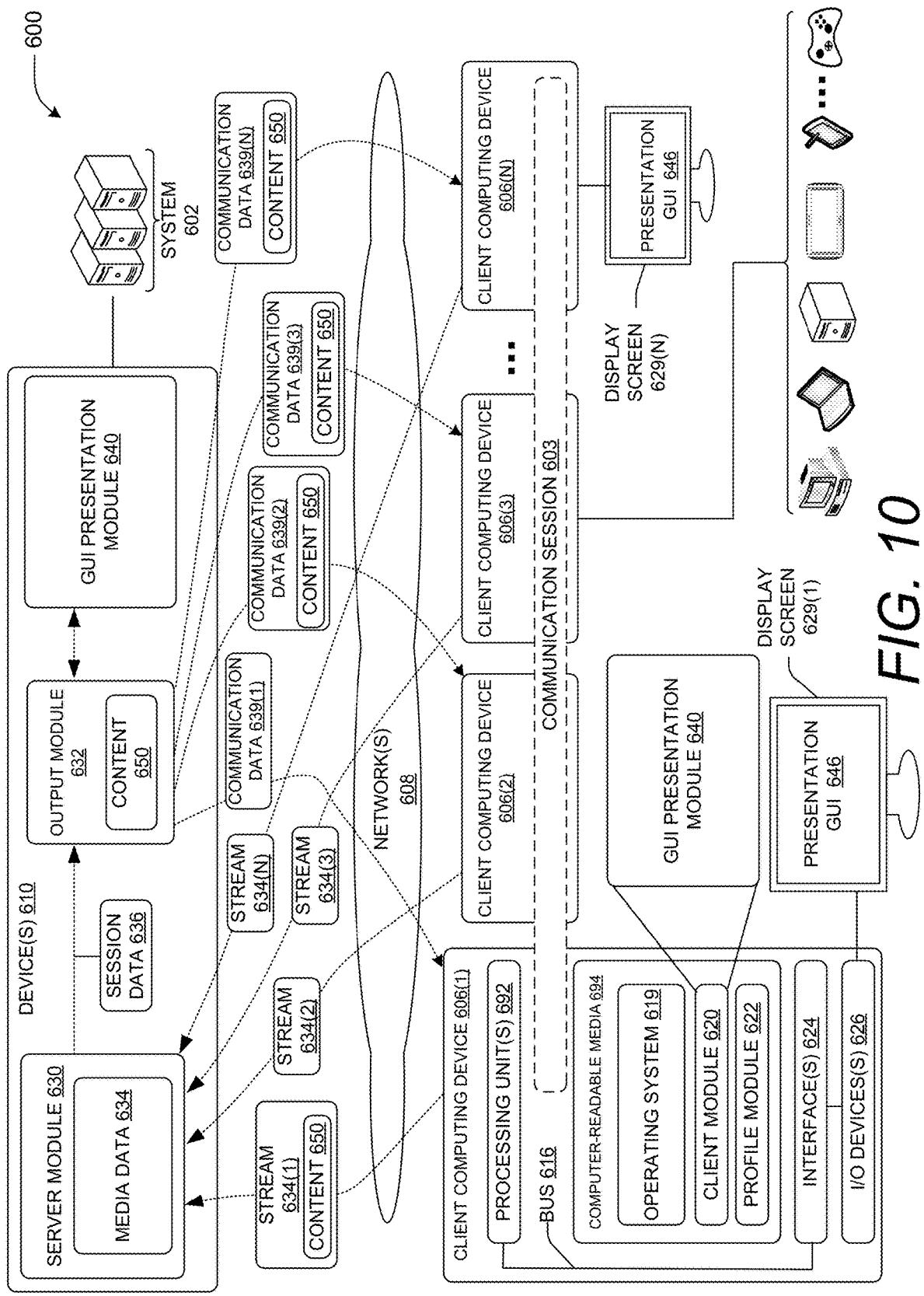
FIG. 10 is a computer architecture diagram illustrating an illustrative computer hardware and software architecture for a computing system capable of implementing aspects of the techniques and technologies presented herein.

The data store 708 may store data for the operations of processes, applications, components, and/or modules stored in computer-readable media 704 and/or executed by data processing unit(s) 702 and/or accelerator(s). For instance, in some examples, the data store 708 may store session data (e.g., session data 636 as shown in FIG. 10), profile data (e.g., associated with a participant profile), and/or other data. The session data can include a total number of participants (e.g., users and/or client computing devices) in a communication session, activity that occurs in the communication session, a list of invitees to the communication session, and/or other data related to when and how the communication session is conducted or hosted.

The data store 708 may also include permission data 714, to indicate the access rights of each user. The access rights can be on a per user and per user interface region basis. Thus, at this granular level, the first user can have rights to see the content shared on the primary presenter region and also share content on the primary presenter region, which are respectively read and write permissions. At the same time, the first user can only have rights to see the contents of the second region (e.g., the Together Mode region) but not contribute to the presentation region, e.g., the user cannot be displayed on the presentation region unless that user has write permissions as a presenter.

The permission data 714 can define any type of activity or status related to the individual users 10A-10F each associated with individual video streams of a plurality of video streams 634. For instance, the contextual data can define a person's role, such as a moderator role. In this case, the moderator can control the permissions of other users including someone's ability to share information within the presentation region or be shown in the presentation region. The moderator can also control audio for each individual and audience members can be muted or allowed to speak to the indication session.

Some or all of the above-referenced data can be stored on separate memories 716 on board one or more data processing unit(s) 702 such as a memory on board a CPU-type processor, a GPU-type processor, an FPGA-type accelerator, a DSP-type accelerator, and/or another accelerator. In this example, the computer-readable media 704 also includes an operating system 718 and application programming interface(s) 710 (APIs) configured to expose the functionality and the data of the device 700 to other devices. Additionally, the computer-readable media 704 includes one or more modules such as the server module 730, the output module 732, and the GUI presentation module 740, although the number of illustrated modules is just an example, and the number may vary. That is, functionality described herein in association with the illustrated modules may be performed by a fewer number of modules or a larger number of modules on one device or spread across multiple devices.

Figure 9:
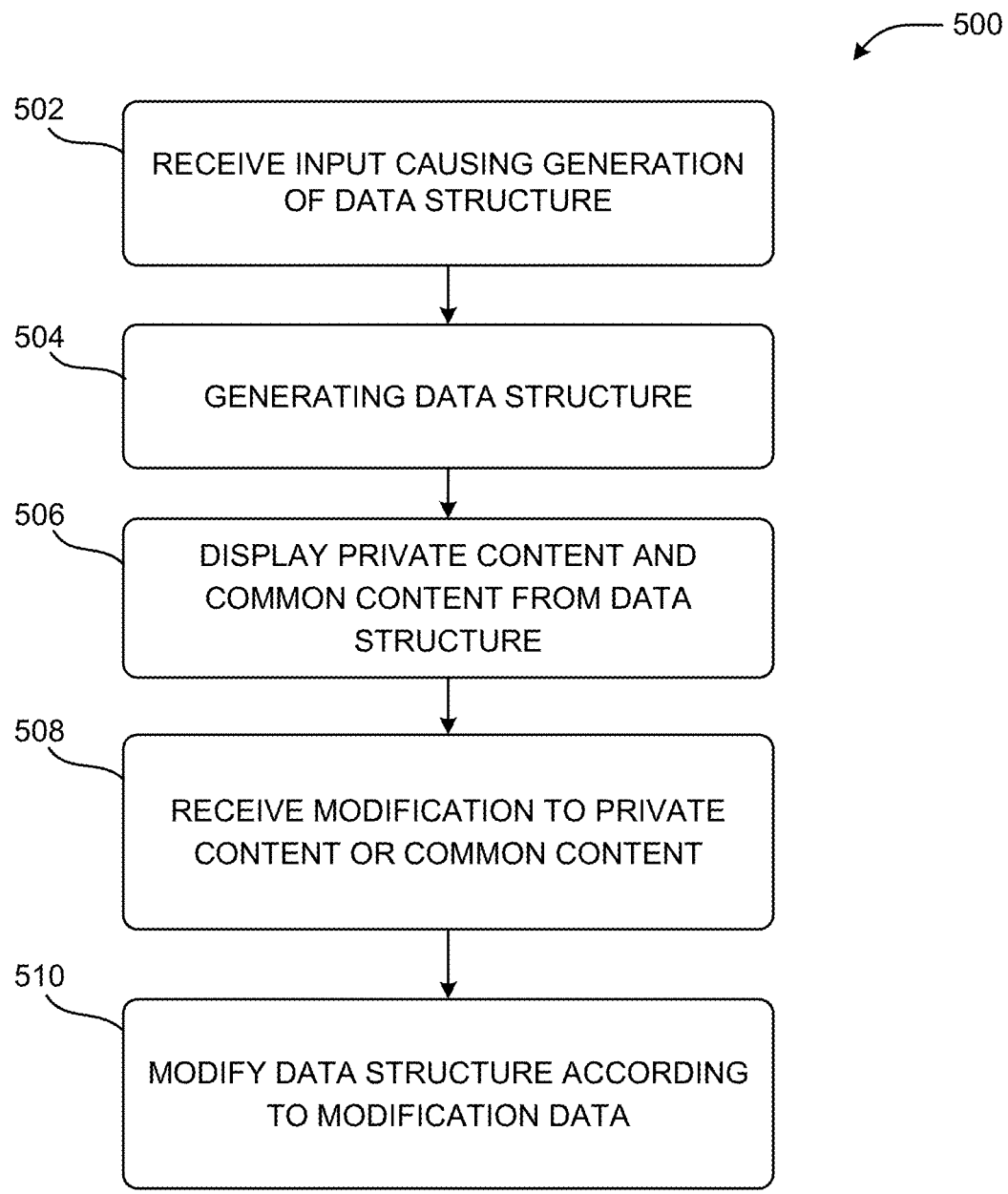
FIG. 9 is a flow diagram showing aspects of a routine for controlling access to private content that is displayed concurrently with common content of a document.

FIG. 9 is a diagram illustrating aspects of a routine 500 for enhanced access control of private content and share content. It should be understood by those of ordinary skill in the art that the operations of the methods disclosed herein are not necessarily presented in any particular order and that performance of some or all of the operations in an alternative order is possible and is contemplated. The operations have been presented in the demonstrated order for ease of description and illustration. Operations may be added, omitted, performed together, and/or performed simultaneously, without departing from the scope of the appended claims.

It should also be understood that the illustrated methods can end at any time and need not be performed in their entirety. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like. Although the example routine described below is operating on a system, e.g., one or more computing devices, it can be appreciated that this routine can be performed on any computing system which may include any number of computers working in concert to perform the operations disclosed herein.

Thus, it should be appreciated that the logical operations described herein are implemented as a sequence of computer implemented acts or program modules running on a computing system such as those described herein and/or as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof.

Additionally, the operations illustrated in FIG. 9 and the other FIGURES can be implemented in association with the example presentation user interfaces UI described above. For instance, the various devices and/or modules described herein can generate, transmit, receive, and/or display data associated with content of a communication session e.g., live content, broadcasted event, recorded content, etc. and/or a presentation UI that includes renderings of one or more participants of remote computing devices, avatars, channels, chat sessions, video streams, images, virtual objects, and/or applications associated with a communication session.

The routine 500 includes an operation 502 where the system can receive an input causing the generation of a data structure. The input can identify content to be designated as private content.

In operation 504, the system can generate the data structure. Degeneration of the data structure can be in response to an input identifying selected content wherein the selected content is designated as private content. In some configurations, the data structure can include a child document and a parent document. In some configurations, the data structure can include a common document and a plurality of metadata files.

At operation 506, the system can display private content and common content to user having appropriate credentials. In some configurations, private content owned by a user, such as the first user, can only be used and viewed by the designated user, e.g., the first user.

Next, at operation 508, the system can receive modification information for the purposes of updating or modifying private content or common content. Modifications can include changes to private content or shared content.

Next, at operation 510, the system can modify the data structure according to the input data. In some configurations, the data structures can propagate changes between files. For instance, if a child file is updated by a second user, modifications of that child file to be propagated to a parent file thus allowing an owner of the current file to view and edit the modifications.

Some of the operations described above can include a first embodiment having a parent document and child document. Another embodiment can include a dynamic assembly of a deliverable file from a metadata file and a common file. For the first embodiment having a parent document and child document, this first embodiment is shown in FIG. 1 through FIG. 2E, where a system virtualizes a common document using the child and parent documents. This includes a data structure having a first file (parent) with private content and common content, and a second file (child) which only has common content. In one example the first user shares a child document, remote user edits the child document, system propagates those changes to other the first user's parent file. This can include the following clauses:

Clause A: A method for controlling access to private content (108) stored in association with common content (107) shared with a plurality of users (10), the method configured for execution on a computing system (100) comprising operations illustrated in FIG. 2B, where a first user designates private content from a document having common content, wherein the private content is identified by receiving input data from a first user for invoking the generation of a data structure (104) configured to control access to the private content (108) associated with common content (107), wherein the input data identifies the private content (108) and at least one file (112, 105) storing the common content (107); other operations illustrated in FIG. 2B, where a system generates the data structure (104) comprising a parent document (105) and a child document (106) in response to receiving the input data (715) identifying the private content (108), wherein the child document comprises the common content and excludes the private content, wherein the parent document comprises the common content and the private content, wherein permission data (714) is configured to allow the first user (10A) to access and modify the common content and the private content of the parent document (105), the permission data associates the parent document (105) to the first user and the permission data is configured to restrict other users from accessing the common content and the private content of the parent document (105); other operations illustrated in FIG. 2C where the system provides other users with access to the child document, e.g., allowing access on a server, emailing the document, by providing the other users access to the child document (106), wherein the access allows the other users to modify the common content of the child document and not allow the other users to modify the common content (107) of the parent document (105); other operations illustrated in FIG. 2D where the system receives edits from the other users, e.g., User 2, can include receiving other input data from the other users, wherein the other input data indicates modifications to the common content of the child document; and other operations illustrated in FIG. 2E where the system can propagate changes of the child document to the parent document of the first user when the first user opens the parent document can include propagating the modifications to the common content (117) of the child document (106) to the common content (117) of the parent document (105) associated with the first user (10A), wherein the propagation is in response to verifying that the child document (106) is linked to the parent document (105), wherein the parent document (105) associated with the first user (10A) is configured to enable a concurrent display of the private content (108) and the modified common content (117) of the parent document (105) on a display device (629) associated with the first user (10A).

Clause B: The method of Clause A, where as shown in FIG. 3B, when the first user edits his or her private content, the edits may only apply to the parent document based on the first user's credentials, which can include receiving additional input data from the first user indicating modifications to the private content (108) associated with an account of the first user (10A); and generating updated private content (118) by applying the modifications of the additional input data to the private content in the parent document (105), wherein the updated private content (118) is only generated in response to verifying that the permissions of the first user (10A) allow the first user to modify the parent document, wherein the permission data restricts the other users from accessing the updated private content (118).

Clause C: The method of any of the Clauses disclosed herein, where described in association with FIGS. 2D and 2E, when the first user edits the common content, the edits are applied to the child document and propagated to the parent, which can include receiving additional input data from the first user indicating modifications to the common content of the child document (106); generating updated common content (117) by applying the modifications of the additional input data to the common content, wherein the modifications are made to the common content of the child document (106); and propagating the updated common content (117) from the child document (106) to the parent document (105).

Clause D: The method of any of the Clauses disclosed herein, where the first user edits the common content: embodiment 1, edits are applied to the parent document and propagated to the child, such as the description of FIGS. 2D and 2E, wherein the method further comprises: receiving additional input data from the first user indicating modifications to the common content of the parent document (105); generating updated common content (117) by applying the modifications of the additional input data to the common content of the parent document (105); and propagating the updated common content (117) from the parent document (105) to the child document (106).

Clause E: The method of any of the Clauses disclosed herein, where other users (User 2-User N) add private data to the file of the first user: embodiment 1, that private data is stored in the private content of the first user's parent document, such as in the description of FIGS. 2D and 2E, wherein the method further comprises: receiving additional input data from a second user of the other users, wherein the additional input data includes additional private data that has a controlled access only permitting access for the second user; and storing the additional private data in the parent document, the permission data only enables the second user to view and edit the additional private data, wherein the permission data restricts the first user from to view or modifying the additional private data.

Clause F: The method of any of the Clauses disclosed herein, wherein the permission data associates the parent document to the child document, wherein the parent document and the child document are stored within a storage device under the control of an account owned by the first user, wherein the permission data is modified by a configuration input by the first user to control access of the other users to the child document.

Clause G: The method of any of the Clauses disclosed herein, wherein the input data includes identities of the other users, wherein the input data causes the configuration of the permission data to allow one or more computers of the other users to access the common content of the child document, wherein access includes operations for enabling the one or more computers of the other users to receive the common content of the child document and modify the common content of the child document.

Clause H: A method, as shown in the example of FIG. 4 through FIG. 6C, for controlling access to private content (108) stored in association with common content (107) shared between a plurality of users (10), the method configured for execution on a computing system (100) comprising operations related to FIG. 5B where a first user can designate private content from a document having shared content, the operations including receiving input data from a first user (10A) for invoking the generation of a data structure (204) configured to control access to the private content (108A) associated with common content (107), wherein the input data identifies the private content (108A) and at least one file (112, 205) for the retrieval of the common content (107); operations related to FIG. 5B where the system can generate a data structure having the common document and metadata files for each participant, the operations including generating the data structure (104) comprising a common document (205) and a plurality of metadata files (206A-206N) in response to receiving the input data identifying the private content (108A), wherein the common document comprises the common content (107) and excludes the private content (108A), wherein a first metadata file (206A) is associated with the first user (10A) and other individual metadata files (206B-206N) are each associated with other individual users (10B-10N), wherein permission data (714) is configured to allow the first user to access and modify the common content (107) of the common document (205) and access and modify the private content of the first metadata file (206A), the permission data (714) is configured to restrict the individual users (10B-10N) from accessing the private content (108A) of the first metadata file (206A), wherein permission data (714) is configured to allow the other individual users (10B-10N) to access the individual metadata files (206B-206N) respectfully owned by the individual users (10B-10N); operations related to FIG. 6B where the system delivers a personalized version of the common content file to User A by incorporating the private metadata file to the common content file, the operations including generating a dynamically assembled file (311) in response to a request from the first user to access the common content (107), wherein the generation of the dynamically assembled file (311) comprises retrieving the common content (107) from the common document (205) and retrieving the private content (108A) from the first metadata file (206A) and integrating the private content (108A) from the first metadata file (206A) into the dynamically assembled file (311) with the common content (107); and operations related to FIGS. 6B and 6C where communication of the personalized version of the file causes a display of the file, the operations including communicating the dynamically assembled file (311) to at least one computing device (11A) causing a display of the private content (108A) associated with the first user (10A) concurrently with the common content (107) retrieved from the dynamically assembled file (311) on the at least one computing device (11A), wherein the communication of the dynamically assembled file (311) is restricted from transmission to computing devices (11B-11N) other than the at least one computing device (11A) associated with the first user (10A).

Clause I: The method of any of the Clauses disclosed herein, which can involve operations related to FIG. 7B where a second user accesses the file for viewing and editing, the method further comprising: generating a second dynamically assembled file (311B) in response to a request from a second user (10B) to access the common content (107), wherein the generation of the second dynamically assembled file (311B) comprises retrieving the common content (107) from the common document (205) and retrieving private content (108B) from the second metadata file (206B) and integrating the private content (108B) from the second metadata file (206B) into the second dynamically assembled file (311B) with the common content (107); and communicating the second dynamically assembled file (311B) to a second computing device (11B) causing a display of the private content (108B) associated with the second user (10B) concurrently with the common content (107) retrieved from the second dynamically assembled file (311B) on the second computing device (11B), wherein the communication of the second dynamically assembled file (311B) is restricted to communication to the second computing device (11B) associated with the second user (10B).

Clause J: The method of any of the Clauses disclosed herein, which can involve operations related to FIG. 8B, where the first user edits his or her private content, wherein the method further comprises: receiving additional input data (312) from the first user indicating modifications to the private content (108A) associated with the first user (10A); and generating updated private content (118A) by applying the modifications of the additional input data to the private content (118) of the first metadata file (206A), wherein the updated private content (118A) is stored within the first metadata file (206A), wherein the updated private content (118A) is only generated in response to verifying that the permissions of the first user (10A) allow the first user to modify the first metadata file (206A), wherein the permission data restricts other users (10B-10N) from accessing the updated private content (118A) stored within the first metadata file (206A).

Clause K: The method of any of the Clauses disclosed herein, which can involve operations related to the example of FIG. 8C, where the second user edits his or her private content, wherein the method further comprises: receiving additional input data (312) from a second user (10B) indicating modifications to the private content (108B) associated with the second user (10B); and generating updated private content (118B) for the second user (10B) by applying the modifications of the additional input data to the private content (118B) of the second metadata file (206B), wherein the updated private content (118B) is stored within the second metadata file (206B), wherein the updated private content (118B) is only generated in response to verifying that the permissions of the second user (10B) allow the second user to modify the second metadata file (206B), wherein the permission data restricts the first user and other users (10A and 10N) from accessing the updated private content (118B) stored within the second metadata file (206B).

Clause L: The method of any of the Clauses disclosed herein, which can involve operations related to the example of FIG. 8C, where when the first user edits the common content, wherein the method further comprises: receiving additional input data (314) from the first user indicating modifications to the common content (107); and generating updated common content (117) by applying the modifications of the additional input data (314) to the common content (107) of the common document (205), wherein the updated common content (117) is stored within the common document (205), wherein the updated common content (117) is only generated in response to verifying that the permissions of the first user (10A) allow the first user to modify the common document (205), wherein the permission data restricts a modification of the private content (108A) stored within the first metadata file (206A) based on the input data (314) indicating the modification to the common content (107).

Clause M: The method of any of the Clauses disclosed herein, wherein the permission data associates the first metadata file (206A) with a first user account (103A), wherein the permission data associates the common document with a common access storage area (210), wherein the permission data controls the users that may access the common access storage area (210), wherein access permissions of the common access storage area (210) can be modified by a user that generated the common document (205) comprising the common content (107), wherein the permission data restricts a second user from accessing the first metadata file that is associated with the first user account.

Clause N: The method of any of the Clauses disclosed herein, wherein the input data (715) includes identities of the other users, wherein the input data causes the configuration of the permission data to allow one or more computers of the other users to access the common content of common document (205), wherein access includes operations for enabling the one or more computers of the other users to receive the common content of the common document and modify the common content of the common document.

Clause O: A computing device (700) for controlling access to private content (108) stored in association with common content (107) shared with a plurality of users (10), the system (100) comprising: one or more processing units (702); and a computer-readable storage medium (704) having encoded thereon computer-executable instructions to cause the one or more processing units (702) to perform a method comprising: receiving input data from a first user for invoking the generation of a data structure (104) configured to control access to the private content (108) associated with common content (107), wherein the input data identifies the private content (108) and at least one file (112, 105) storing the common content (107); generating the data structure (104) comprising a parent document (105) and a child document (106) in response to receiving the input data (715) identifying the private content (108), wherein the child document comprises the common content and excludes the private content, wherein the parent document comprises the common content and the private content, wherein permission data (714) is configured to allow the first user (10A) to access and modify the common content and the private content of the parent document (105), the permission data associates the parent document (105) to the first user and the permission data is configured to restrict other users from accessing the common content and the private content of the parent document (105); providing the other users access to the child document (106) to the other users, wherein the access allows the other users to modify the common content of the child document and not allow the other users to modify the common content (107) of the parent document (105); receiving other input data from the other users, wherein the other input data indicates modifications to the common content of the child document; and propagating the modifications to the common content (117) of the child document (106) to the common content (117) of the parent document (105) associated with the first user (10A), wherein the propagation is in response to verifying that the child document (106) is linked to the parent document (105), wherein the parent document (105) associated with the first user (10A) is configured to enable a concurrent display of the private content (108) and the modified common content (117) of the parent document (105) on a display device (629) associated with the first user (10A).

Clause P: The device of Clause O, wherein the method further comprises: receiving additional input data from the first user indicating modifications to the private content (108) associated with an account of the first user (10A); and generating updated private content (118) by applying the modifications of the additional input data to the private content in the parent document (105), wherein the updated private content (118) is only generated in response to verifying that the permissions of the first user (10A) allow the first user to modify the parent document, wherein the permission data restricts the other users from accessing the updated private content (118).

Clause Q: The device of Clause P, wherein the method further comprises: receiving additional input data from the first user indicating modifications to the common content of the child document (106); generating updated common content (117) by applying the modifications of the additional input data to the common content, wherein the modifications are made to the common content of the child document (106); and propagating the updated common content (117) from the child document (106) to the parent document (105).

Clause R: The device of Clauses P and 0, wherein the method further comprises: receiving additional input data from the first user indicating modifications to the common content of the parent document (105); generating updated common content (117) by applying the modifications of the additional input data to the common content of the parent document (105); and propagating the updated common content (117) from the parent document (105) to the child document (106).

Clause S: The device of Clauses P through R, wherein the method further comprises: receiving additional input data from a second user of the other users, wherein the additional input data includes additional private data that has a controlled access only permitting access for the second user; and storing the additional private data in the parent document, the permission data only enables the second user to view and edit the additional private data, wherein the permission data restricts the first user from to view or modifying the additional private data.

Clause T: The device of Clauses P through S, wherein the permission data associates the parent document to the child document, wherein the parent document and the child document are stored within a storage device under the control of an account owned by the first user, wherein the permission data is modified by a configuration input by the first user to control access of the other users to the child document.

Clause U: The device of Clauses P through T, wherein the input data includes identities of the other users, wherein the input data causes the configuration of the permission data to allow one or more computers of the other users to access the common content of the child document, wherein access includes operations that enable the one or more computers of the other users to receive the common content of the child document and modify the common content of the child document.

In some configurations, a system can generate a two-file data structure. As described above, a system can use the parent file (private and shared) and a child file (shared), e.g., embodiment 1, or the system can use the metadata file (private) and common document (shared), e.g., embodiment 2. In yet another configuration, the data structure can include the common features from these embodiments. For example, a first file can include private content. This first file can include features of the parent file (embodiment 1) and the metadata file (embodiment 2). A second file can include common content. This can be the child file (embodiment 1) and the common document (embodiment 2). Thus, the parent file of embodiment 1 in some cases can have shared content or the shared content may be restricted from the parent file. These file are generated in response to the input data that identifies private content from common content that is shared with several users.

Clause V: A method for controlling access to private content (108) stored in association with common content (107) shared with a plurality of users (10), the method configured for execution on a computing system (100) comprising: operations related to the example shown in FIG. 2B or 5B, where a first user can designate private content from a document having common content, the operations comprising receiving input data from a first user for invoking the generation of a data structure (104 or 204) configured to control access to the private content (108) associated with common content (107), wherein the input data identifies the private content (108) of the common content (107) stored in at least one file (112); operations related to the example shown in FIG. 2B or 5B, where the system generates a data structure having the first file and second file with defined permissions, the operations comprising generating the data structure (104) comprising a first file (105 or 206) and a second file (106 or 205) in response to receiving the input data (715) identifying the private content (108), wherein the first file (105 or 206) comprises the private content (108), wherein the second file comprises the common content (107) and excludes the private content (108); operations related to the example shown in FIG. 11, where configuration data now defines a separate element per feedback, the operations comprising configurating permission data (714) for the first file and the second file in response to the input data (715) identifying the private content (108), wherein the permission data (714) is configured to allow the first user (10A) to view and modify the private content of the first (105), the permission data associates the first file (105) to the first user, the permission data is configured to restrict other users from accessing the private content of the first file (105); the permission data is further configured to allow the other users to view and modify the common content (107) of the second file; and operations related to the example shown in FIGS. 2C and 7C where a two-file structure and permissions causes display of shared content with all users and restriction of the private data for all users but the first user, the operations comprising using the permission data (714) to cause a first display of a first user interface arrangement (12A) for a first computing device associated with the first user (10A), the first user interface arrangement (12A) comprising the private content (108) from the first file (105 or 206) and the common content (107), the permission data (714) also permitting a second display of a second user interface arrangement (12B) for a second computing device associated with a second user (10B) of the other users, the second user interface arrangement (12B) comprising the common content (107) from the second file (106 or 205), the permission data (714) restricting the second computing device associated with a second user (10B) from receiving and displaying the private content (108) from the first file (105 or 206).

Clause W: The method of any of Clauses disclosed herein, wherein the first file further comprises common content, wherein the first file having the common content and the private content is generated in response to receiving the input data identifying the private content from common content of the at least one file (112).

Clause X: The method of any of Clauses disclosed herein, further comprising: receiving additional input data from the second user (10B), wherein the additional input data indicates modifications to the common content of the second file to generate modified content in the second file; and propagating the modified content from the second file to the first file.

Clause Y: The method of any of Clauses disclosed herein, wherein the first file is first metadata file associated with the first user, wherein the method further comprises: generating a dynamically assembled file (311) in response to a request from the first user to access the common content (107), wherein the generation of the dynamically assembled file (311) comprises retrieving the common content (107) from the second file (205) and retrieving the private content (108A) from the first metadata file (206A) and integrating the private content (108A) from the first metadata file (206A) into the dynamically assembled file (311) with the common content (107); and operations related to the examples of FIGS. 6B and 6C, where the communication of the personalized version of the file causes a display of the file, the operations comprising communicating the dynamically assembled file (311) to at least one computing device (11A) causing a display of the private content (108A)

associated with the first user (10A) concurrently with the common content (107) retrieved from the dynamically assembled file (311) on the at least one computing device (11A), wherein the communication of the dynamically assembled file (311) is restricted from transmission to computing devices (11B-11N) other than the at least one computing device (11A) associated with the first user (10A).

Clause Z: The method of any of Clauses disclosed herein, relating to the example of FIG. 7B where a second user accesses the file for viewing and editing, the method further comprising: generating a second dynamically assembled file (311B) in response to a request from a second user (10B) to access the common content (107), wherein the generation of the second dynamically assembled file (311B) comprises retrieving the common content (107) from the common document (205) and retrieving private content (108B) from the second metadata file (206B) and integrating the private content (108B) from the second metadata file (206B) into the second dynamically assembled file (311B) with the common content (107); and communicating the second dynamically assembled file (311B) to a second computing device (11B) causing a display of the private content (108B) associated with the second user (10B) concurrently with the common content (107) retrieved from the second dynamically assembled file (311B) on the second computing device (11B), wherein the communication of the second dynamically assembled file (311B) is restricted to communication to the second computing device (11B) associated with the second user (10B).

FIG. 10 is a diagram illustrating an example environment 600 in which a system 602 can implement the techniques disclosed herein. It should be appreciated that the above-described subject matter may be implemented as a computer-controlled apparatus, a computer process, a computing system, or as an article of manufacture such as a computer-readable storage medium. The operations of the example methods are illustrated in individual blocks and summarized with reference to those blocks. The methods are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations.

Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more device(s) such as one or more internal or external CPUs or GPUs, and/or one or more pieces of hardware logic such as field-programmable gate arrays ("FPGAs"), digital signal processors ("DSPs"), or other types of accelerators.

All of the methods and processes described above may be embodied in, and fully automated via, software code modules executed by one or more general purpose computers or processors. The code modules may be stored in any type of computer-readable storage medium or other computer storage device, such as those described below. Some or all of the methods may alternatively be embodied in specialized computer hardware, such as that described below.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art.

In some implementations, a system 602 may function to collect, analyze, and share data that is displayed to users of a communication session 603. As illustrated, the communication session 603 may be implemented between a number of client computing devices 606(1) through 606(N) (where N is a number having a value of two or greater) that are associated with or are part of the system 602. The client computing devices 606(1) through 606(N) enable users, also referred to as individuals, to participate in the communication session 603.

In this example, the communication session 603 is hosted, over one or more network(s) 608, by the system 602. That is, the system 602 can provide a service that enables users of the client computing devices 606(1) through 606(N) to participate in the communication session 603 (e.g., via a live viewing and/or a recorded viewing). Consequently, a "participant" to the communication session 603 can comprise a user and/or a client computing device (e.g., multiple users may be in a room participating in a communication session via the use of a single client computing device), each of which can communicate with other participants. As an alternative, the communication session 603 can be hosted by one of the client computing devices 606(1) through 606(N) utilizing peer-to-peer technologies. The system 602 can also host chat conversations and other team collaboration functionality (e.g., as part of an application suite).

In some implementations, such chat conversations and other team collaboration functionality are considered external communication sessions distinct from the communication session 603. A computing system 602 that collects participant data in the communication session 603 may be able to link to such external communication sessions. Therefore, the system may receive information, such as date, time, session particulars, and the like, that enables connectivity to such external communication sessions. In one example, a chat conversation can be conducted in accordance with the communication session 603. Additionally, the system 602 may host the communication session 603, which includes at least a plurality of participants co-located at a meeting location, such as a meeting room or auditorium, or located in disparate locations. A communication session 603 can include a start time and an end time, which can determine when video streams and live audio can be shared. Text and content can be shared outside of the start time and end time.

In examples described herein, client computing devices 606(1) through 606(N) participating in the communication session 603 are configured to receive and render for display, on a user interface of a display screen, communication data. The communication data can comprise a collection of various instances, or streams, of live content and/or recorded content. The collection of various instances, or streams, of live content and/or recorded content may be provided by one or more cameras, such as video cameras. For example, an individual stream of live or recorded content can comprise media data associated with a video feed provided by a video camera (e.g., audio and visual data that capture the appearance and speech of a user participating in the communication session). In some implementations, the video feeds may comprise such audio and visual data, one or more still images, and/or one or more avatars. The one or more still images may also comprise one or more avatars.

Another example of an individual stream of live or recorded content can comprise media data that includes an avatar of a user participating in the communication session along with audio data that captures the speech of the user. Yet another example of an individual stream of live or recorded content can comprise media data that includes a file displayed on a display screen along with audio data that captures the speech of a user. Accordingly, the various streams of live or recorded content within the communication data enable a remote meeting to be facilitated between a group of people and the sharing of content within the group of people. In some implementations, the various streams of live or recorded content within the communication data may originate from a plurality of co-located video cameras, positioned in a space, such as a room, to record or stream live a presentation that includes one or more individuals presenting and one or more individuals consuming presented content.

A participant or attendee can view content of the communication session 603 live as activity occurs, or alternatively, via a recording at a later time after the activity occurs. In the examples described herein, client computing devices 606(1) through 606(N) participating in the communication session 603 are configured to receive and render for display, on a user interface of a display screen, communication data. The communication data can comprise a collection of various instances, or streams, of live and/or recorded content. For example, an individual stream of content can comprise media data associated with a video feed (e.g., audio and visual data that capture the appearance and speech of a user participating in the communication session). Another example of an individual stream of content can comprise media data that includes an avatar of a user participating in the conference session along with audio data that captures the speech of the user. Yet another example of an individual stream of content can comprise media data that includes a content item displayed on a display screen and/or audio data that captures the speech of a user. Accordingly, the various streams of content within the communication data enable a meeting or a broadcast presentation to be facilitated amongst a group of people dispersed across remote locations.

A participant or attendee to a communication session is a person that is in range of a camera, or other image and/or audio capture device such that actions and/or sounds of the person which are produced while the person is viewing and/or listening to the content being shared via the communication session can be captured (e.g., recorded). For instance, a participant may be sitting in a crowd viewing the shared content live at a broadcast location where a stage presentation occurs. Or a participant may be sitting in an office conference room viewing the shared content of a communication session with other colleagues via a display screen. Even further, a participant may be sitting or standing in front of a personal device (e.g., tablet, smartphone, computer, etc.) viewing the shared content of a communication session alone in their office or at home.

The system 602 of FIG. 10 includes device(s) 610. The device(s) 610 and/or other components of the system 602 can include distributed computing resources that communicate with one another and/or with the client computing devices 606(1) through 606(N) via the one or more network(s) 608. In some examples, the system 602 may be an independent system that is tasked with managing aspects of one or more communication sessions such as communication session 603. As an example, the system 602 may be managed by entities such as SLACK, WEBEX, GOTOMEETING, GOOGLE HANGOUTS, etc.

Network(s) 608 may include, for example, public networks such as the Internet, private networks such as an institutional and/or personal intranet, or some combination of private and public networks. Network(s) 608 may also include any type of wired and/or wireless network, including but not limited to local area networks ("LANs"), wide area networks ("WANs"), satellite networks, cable networks, Wi-Fi networks, WiMax networks, mobile communications networks (e.g., 3G, 4G, and so forth) or any combination thereof. Network(s) 608 may utilize communications protocols, including packet-based and/or datagram-based protocols such as Internet protocol ("IP"), transmission control protocol ("TCP"), user datagram protocol ("UDP"), or other types of protocols. Moreover, network(s) 608 may also include a number of devices that facilitate network communications and/or form a hardware basis for the networks, such as switches, routers, gateways, access points, firewalls, base stations, repeaters, backbone devices, and the like.

In some examples, network(s) 608 may further include devices that enable connection to a wireless network, such as a wireless access point ("WAP"). Examples support connectivity through WAPs that send and receive data over various electromagnetic frequencies (e.g., radio frequencies), including WAPs that support Institute of Electrical and Electronics Engineers ("IEEE") 802.11 standards (e.g., 802.11g, 802.11n, 802.11ac and so forth), and other standards.

In various examples, device(s) 610 may include one or more computing devices that operate in a cluster or other grouped configuration to share resources, balance load, increase performance, provide fail-over support or redundancy, or for other purposes. For instance, device(s) 610 may belong to a variety of classes of devices such as traditional server-type devices, desktop computer-type devices, and/or mobile-type devices. Thus, although illustrated as a single type of device or a server-type device, device(s) 610 may include a diverse variety of device types and are not limited to a particular type of device. Device(s) 610 may represent, but are not limited to, server computers, desktop computers, web-server computers, personal computers, mobile computers, laptop computers, tablet computers, or any other sort of computing device.

A client computing device (e.g., one of client computing device(s) 606(1) through 606(N)) (each of which are also referred to herein as a "data processing system") may belong to a variety of classes of devices, which may be the same as, or different from, device(s) 610, such as traditional client-type devices, desktop computer-type devices, mobile-type devices, special purpose-type devices, embedded-type devices, and/or wearable-type devices. Thus, a client computing device can include, but is not limited to, a desktop computer, a game console and/or a gaming device, a tablet computer, a personal data assistant ("PDA"), a mobile phone/tablet hybrid, a laptop computer, a telecommunication device, a computer navigation type client computing device such as a satellite-based navigation system including a global positioning system ("GPS") device, a wearable device, a virtual reality ("VR") device, an augmented reality ("AR") device, an implanted computing device, an automotive computer, a network-enabled television, a thin client, a terminal, an Internet of Things ("IoT") device, a work station, a media player, a personal video recorder ("PVR"), a set-top box, a camera, an integrated component (e.g., a peripheral device) for inclusion in a computing device, an appliance, or any other sort of computing device. Moreover, the client computing device may include a combination of the earlier listed examples of the client computing device such as, for example, desktop computer-type devices or a mobile-type device in combination with a wearable device, etc.

Client computing device(s) 606(1) through 606(N) of the various classes and device types can represent any type of computing device having one or more data processing unit(s) 692 operably connected to computer-readable media 694 such as via a bus 616, which in some instances can include one or more of a system bus, a data bus, an address bus, a PCI bus, a Mini-PCI bus, and any variety of local, peripheral, and/or independent buses.

Executable instructions stored on computer-readable media 694 may include, for example, an operating system 619, a client module 620, a profile module 622, and other modules, programs, or applications that are loadable and executable by data processing units(s) 692.

Client computing device(s) 606(1) through 606(N) may also include one or more interface(s) 624 to enable communications between client computing device(s) 606(1) through 606(N) and other networked devices, such as device(s) 610, over network(s) 608. Such network interface(s) 624 may include one or more network interface controllers (NICs) or other types of transceiver devices to send and receive communications and/or data over a network. Moreover, client computing device(s) 606(1) through 606(N) can include input/output ("I/O") interfaces (devices) 626 that enable communications with input/output devices such as user input devices including peripheral input devices (e.g., a game controller, a keyboard, a mouse, a pen, a voice input device such as a microphone, a video camera for obtaining and providing video feeds and/or still images, a touch input device, a gestural input device, and the like) and/or output devices including peripheral output devices (e.g., a display, a printer, audio speakers, a haptic output device, and the like). FIG. 10 illustrates that client computing device 606(1) is in some way connected to a display device (e.g., a display screen 629(N)), which can display a UI according to the techniques described herein.

In the example environment 600 of FIG. 10, client computing devices 606(1) through 606(N) may use their respective client modules 620 to connect with one another and/or other external device(s) in order to participate in the communication session 603, or in order to contribute activity to a collaboration environment. For instance, a first user may utilize a client computing device 606(1) to communicate with a second user of another client computing device 606(2). When executing client modules 620, the users may share data, which may cause the client computing device 606(1) to connect to the system 602 and/or the other client computing devices 606(2) through 606(N) over the network(s) 608.

The client computing device(s) 606(1) through 606(N) may use their respective profile modules 622 to generate participant profiles (not shown in FIG. 10) and provide the participant profiles to other client computing devices and/or to the device(s) 610 of the system 602. A participant profile may include one or more of an identity of a user or a group of users (e.g., a name, a unique identifier ("ID"), etc.), user data such as personal data, machine data such as location (e.g., an IP address, a room in a building, etc.) and technical capabilities, etc. Participant profiles may be utilized to register participants for communication sessions.

As shown in FIG. 10, the device(s) 610 of the system 602 include a server module 630 and an output module 632. In this example, the server module 630 is configured to receive, from individual client computing devices such as client computing devices 606(1) through 606(N), media streams 634(1) through 634(N). As described above, media streams can comprise a video feed (e.g., audio and visual data associated with a user), audio data which is to be output with a presentation of an avatar of a user (e.g., an audio only experience in which video data of the user is not transmitted), text data (e.g., text messages), file data and/or screen sharing data (e.g., a document, a slide deck, an image, a video displayed on a display screen, etc.), and so forth. Thus, the server module 630 is configured to receive a collection of various media streams 634(1) through 634(N) during a live viewing of the communication session 603 (the collection being referred to herein as "media data 634"). In some scenarios, not all of the client computing devices that participate in the communication session 603 provide a media stream. For example, a client computing device may only be a consuming, or a "listening", device such that it only receives content associated with the communication session 603 but does not provide any content to the communication session 603.

In various examples, the server module 630 can select aspects of the media streams 634 that are to be shared with individual ones of the participating client computing devices 606(1) through 606(N). Consequently, the server module 630 may be configured to generate session data 636 based on the streams 634 and/or pass the session data 636 to the output module 632. Then, the output module 632 may communicate communication data 639 to the client computing devices (e.g., client computing devices 606(1) through 606(3) participating in a live viewing of the communication session). The communication data 639 may include video, audio, and/or other content data, provided by the output module 632 based on content 650 associated with the output module 632 and based on received session data 636. The content 650 can include the streams 634 or other shared data, such as an image file, a spreadsheet file, a slide deck, a document, etc. The streams 634 can include a video component depicting images captured by an I/O device 626 on each client computer.

As shown, the output module 632 transmits communication data 639(1) to client computing device 606(1), and transmits communication data 639(2) to client computing device 606(2), and transmits communication data 639(3) to client computing device 606(3), etc. The communication data 639 transmitted to the client computing devices can be the same or can be different (e.g., positioning of streams of content within a user interface may vary from one device to the next).

In various implementations, the device(s) 610 and/or the client module 620 can include GUI presentation module 640. The GUI presentation module 640 may be configured to analyze communication data 639 that is for delivery to one or more of the client computing devices 606. Specifically, the UI presentation module 640, at the device(s) 610 and/or the client computing device 606, may analyze communication data 639 to determine an appropriate manner for displaying video, image, and/or content on the display screen 629 of an associated client computing device 606. In some implementations, the GUI presentation module 640 may provide video, image, and/or content to a presentation GUI 646 rendered on the display screen 629 of the associated client computing device 606. The presentation GUI 646 may be caused to be rendered on the display screen 629 by the GUI presentation module 640. The presentation GUI 646 may include the video, image, and/or content analyzed by the GUI presentation module 640.

In some implementations, the presentation GUI 646 may include a plurality of sections or grids that may render or comprise video, image, and/or content for display on the display screen 629. For example, a first section of the presentation GUI 646 may include a video feed of a presenter or individual, a second section of the presentation GUI 646 may include a video feed of an individual consuming meeting information provided by the presenter or individual. The GUI presentation module 640 may populate the first and second sections of the presentation GUI 646 in a manner that properly imitates an environment experience that the presenter and the individual may be sharing.

In some implementations, the GUI presentation module 640 may enlarge or provide a zoomed view of the individual represented by the video feed in order to highlight a reaction, such as a facial feature, the individual had to the presenter. In some implementations, the presentation GUI 646 may include a video feed of a plurality of participants associated with a meeting, such as a general communication session. In other implementations, the presentation GUI 646 may be associated with a channel, such as a chat channel, enterprise Teams channel, or the like. Therefore, the presentation GUI 646 may be associated with an external communication session that is different from the general communication session.

FIG. 11 illustrates a diagram that shows example components of an example device 700 (also referred to herein as a "computing device") configured to generate data for some of the user interfaces disclosed herein. The device 700 may generate data that may include one or more sections that may render or comprise video, images, virtual objects, and/or content for display on the display screen 629. The device 700 may represent one of the device(s) described herein. Additionally, or alternatively, the device 700 may represent one of the client computing devices 606.

As illustrated, the device 700 includes one or more data processing unit(s) 702, computer-readable media 704, and communication interface(s) 706. The components of the device 700 are operatively connected, for example, via a bus 709, which may include one or more of a system bus, a data bus, an address bus, a PCI bus, a Mini-PCI bus, and any variety of local, peripheral, and/or independent buses.

As utilized herein, data processing unit(s), such as the data processing unit(s) 702 and/or data processing unit(s) 692, may represent, for example, a CPU-type data processing unit, a GPU-type data processing unit, a field-programmable gate array ("FPGA"), another class of DSP, or other hardware logic components that may, in some instances, be driven by a CPU. For example, and without limitation, illustrative types of hardware logic components that may be utilized include Application-Specific Integrated Circuits ("ASICs"), Application-Specific Standard Products ("ASSPs"), System-on-a-Chip Systems ("SOCs"), Complex Programmable Logic Devices ("CPLDs"), etc.

As utilized herein, computer-readable media, such as computer-readable media 704 and computer-readable media 694, may store instructions executable by the data processing unit(s). The computer-readable media may also store instructions executable by external data processing units such as by an external CPU, an external GPU, and/or executable by an external accelerator, such as an FPGA type accelerator, a DSP type accelerator, or any other internal or external accelerator. In various examples, at least one CPU, GPU, and/or accelerator is incorporated in a computing device, while in some examples one or more of a CPU, GPU, and/or accelerator is external to a computing device.

Computer-readable media, which might also be referred to herein as a computer-readable medium, may include computer storage media and/or communication media. Computer storage media may include one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random access memory ("RAM"), static random-access memory ("SRAM"), dynamic random-access memory ("DRAM"), phase change memory ("PCM"), read-only memory ("ROM"), erasable programmable read-only memory ("EPROM"), electrically erasable programmable read-only memory ("EEPROM"), flash memory, compact disc read-only memory ("CD-ROM"), digital versatile disks ("DVDs"), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device. The computer storage media can also be referred to herein as computer-readable storage media, non-transitory computer-readable storage media, non-transitory computer-readable medium, or computer storage medium.

In contrast to computer storage media, communication media may embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

Communication interface(s) 706 may represent, for example, network interface controllers ("NICs") or other types of transceiver devices to send and receive communications over a network. Furthermore, the communication interface(s) 706 may include one or more video cameras and/or audio devices 722 to enable generation of video feeds and/or still images, and so forth.

In the illustrated example, computer-readable media 704 includes a data store 708. In some examples, the data store 708 includes data storage such as a database, data warehouse, or other type of structured or unstructured data storage. In some examples, the data store 708 includes a corpus and/or a relational database with one or more tables, indices, stored procedures, and so forth to enable data access including one or more of hypertext markup language ("HTML") tables, resource description framework ("RDF") tables, web ontology language ("OWL") tables, and/or extensible markup language ("XML") tables, for example.

The data store 708 may store data for the operations of processes, applications, components, and/or modules stored in computer-readable media 704 and/or executed by data processing unit(s) 702 and/or accelerator(s). For instance, in some examples, the data store 708 may store session data (e.g., session data 636 as shown in FIG. 10), profile data (e.g., associated with a participant profile), and/or other data. The session data can include a total number of participants (e.g., users and/or client computing devices) in a communication session, activity that occurs in the communication session, a list of invitees to the communication session, and/or other data related to when and how the communication session is conducted or hosted.

The data store 708 may also include permission data 714, to indicate the access rights of each user. In the permission data 714, the parent document is linked to the child document. The permissions can also define the access and restrictions described here. For instance, the permission data 714 is configured to allow the first user (10A) to access and modify the common content and the private content of the parent document (105). The permission data associates the parent document (105) to the first user and the permission data is configured to restrict other users from accessing the common content and the private content of the parent document 105. The permission data 714 can also link the parent document to the child document.

Alternately, some or all of the above-referenced data can be stored on separate memories 716 on board one or more data processing unit(s) 702 such as a memory on board a CPU-type processor, a GPU-type processor, an FPGA-type accelerator, a DSP-type accelerator, and/or another accelerator. In this example, the computer-readable media 704 also includes an operating system 718 and application programming interface(s) 710 (APIs) configured to expose the functionality and the data of the device 700 to other devices. Additionally, the computer-readable media 704 includes one or more modules such as the server module 730, the output module 732, and the GUI presentation module 740, although the number of illustrated modules is just an example, and the number may vary. That is, functionality described herein in association with the illustrated modules may be performed by a fewer number of modules or a larger number of modules on one device or spread across multiple devices.

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

We claim:

1. A method for controlling access to private content stored in association with common content shared with a plurality of users, the method configured for execution on a computing system comprising:
   receiving input data from a first user for invoking the generation of a data structure configured to control access to the private content associated with common content, wherein the input data identifies the private content of the common content stored in at least one file;
   generating the data structure comprising a first file and a second file in response to receiving the input data identifying the private content, wherein the first file comprises the private content, wherein the second file comprises the common content and excludes the private content;
   configuring permission data for the first file and the second file in response to the input data identifying the private content, wherein the permission data is configured to allow the first user to view and modify the private content of the first, the permission data associates the first file to the first user, the permission data is configured to restrict other users from accessing the private content of the first file; the permission data is further configured to allow the other users to view and modify the common content of the second file; and
   using the permission data to cause a first display of a first user interface arrangement for a first computing device associated with the first user, the first user interface arrangement comprising the private content from the first file and the common content, the permission data also permitting a second display of a second user interface arrangement for a second computing device associated with a second user of the other users, the second user interface arrangement comprising the common content from the second file, the permission data restricting the second computing device associated with a second user from receiving and displaying the private content from the first file.

2. The method of claim 1, wherein the first file further comprises common content, wherein the first file having the common content and the private content is generated in response to receiving the input data identifying the private content from common content of the at least one file.

3. The method of claim 1, further comprising:
   receiving additional input data from the second user, wherein the additional input data indicates modifications to the common content of the second file to generate modified content in the second file; and
   propagating the modified content from the second file to the first file.

4. The method of claim 3, wherein the modified content that is propagated from the second file to the first file is controlled by the permission data, wherein the permission data allows the first user to view and modify the modified content.

5. The method of claim 1, wherein the first file is first metadata file associated with the first user, wherein the method further comprises:
   generating a dynamically assembled file in response to a request from the first user to access the common content, wherein the generation of the dynamically assembled file comprises retrieving the common content from the second file and retrieving the private content from the first metadata file and integrating the private content from the first metadata file into the dynamically assembled file with the common content; and
   communicating the dynamically assembled file to at least one computing device causing a display of the private content associated with the first user concurrently with the common content retrieved from the dynamically assembled file on the at least one computing device, wherein the communication of the dynamically assembled file is restricted from transmission to computing devices other than the at least one computing device associated with the first user.

6. The method of claim 1, further comprising:
   generating a second dynamically assembled file in response to a request from a second user to access the common content, wherein the generation of the second dynamically assembled file comprises retrieving the common content from the common document and retrieving private content from the second metadata file and integrating the private content from the second metadata file into the second dynamically assembled file with the common content; and communicating the second dynamically assembled file to a second computing device causing a display of the private content associated with the second user concurrently with the common content retrieved from the second dynamically assembled file on the second computing device, wherein the communication of the second dynamically assembled file is restricted to communication to the second computing device associated with the second user.

7. The method of claim 1, wherein the method further comprises:

receiving additional input data from the second user, wherein the additional input data includes additional private data that has a controlled access only permitting access for the second user; and storing the additional private data in the first file, the permission data only enables the second user to view and edit the additional private data, wherein the permission data restricts the first user from to view or modifying the additional private data stored in the first file.

8. A computing device for controlling access to private content stored in association with common content shared with a plurality of users, comprising:

one or more processing units; and a computer-readable storage medium having encoded thereon computer-executable instructions to cause the one or more processing units to perform the method of:

receiving input data from a first user for invoking the generation of a data structure configured to control access to the private content associated with common content, wherein the input data identifies the private content of the common content stored in at least one file;

generating the data structure comprising a first file and a second file in response to receiving the input data identifying the private content, wherein the first file comprises the private content, wherein the second file comprises the common content and excludes the private content;

configurating permission data for the first file and the second file in response to the input data identifying the private content, wherein the permission data is configured to allow the first user to view and modify the private content of the first, the permission data associates the first file to the first user, the permission data is configured to restrict other users from accessing the private content of the first file; the permission data is further configured to allow the other users to view and modify the common content of the second file; and using the permission data to cause a first display of a first user interface arrangement for a first computing device associated with the first user, the first user interface arrangement comprising the private content from the first file and the common content, the permission data also permitting a second display of a second user interface arrangement for a second computing device associated with a second user of the other users, the second user interface arrangement comprising the common content from the second file, the permission data restricting the second computing device associated with a second user from receiving and displaying the private content from the first file.

9. The computing device of claim 8, wherein the first file further comprises common content, wherein the first file having the common content and the private content is generated in response to receiving the input data identifying the private content from common content of the at least one file.

10. The computing device of claim 8, wherein the method further comprises:

receiving additional input data from the second user, wherein the additional input data indicates modifications to the common content of the second file to generate modified content in the second file; and propagating the modified content from the second file to the first file.

11. The computing device of claim 10, wherein the modified content that is propagated from the second file to the first file is controlled by the permission data, wherein the permission data allows the first user to view and modify the modified content.

12. The computing device of claim 8, wherein the first file is first metadata file associated with the first user, wherein the method further comprises:

generating a dynamically assembled file in response to a request from the first user to access the common content, wherein the generation of the dynamically assembled file comprises retrieving the common content from the second file and retrieving the private content from the first metadata file and integrating the private content from the first metadata file into the dynamically assembled file with the common content; and communicating the dynamically assembled file to at least one computing device causing a display of the private content associated with the first user concurrently with the common content retrieved from the dynamically assembled file on the at least one computing device, wherein the communication of the dynamically assembled file is restricted from transmission to computing devices other than the at least one computing device associated with the first user.

13. The method of claim 12, wherein the method further comprises:

generating a second dynamically assembled file in response to a request from a second user to access the common content, wherein the generation of the second dynamically assembled file comprises retrieving the common content from the common document and retrieving private content from the second metadata file and integrating the private content from the second metadata file into the second dynamically assembled file with the common content; and communicating the second dynamically assembled file to a second computing device causing a display of the private content associated with the second user concurrently with the common content retrieved from the second dynamically assembled file on the second computing device, wherein the communication of the second dynamically assembled file is restricted to communication to the second computing device associated with the second user.

14. The method of claim 12, wherein the method further comprises:

receiving additional input data from the second user, wherein the additional input data includes additional private data that has a controlled access only permitting access for the second user; and storing the additional private data in the first file, the permission data only enables the second user to view and edit the additional private data, wherein the permission data restricts the first user from to view or modifying the additional private data stored in the first file.

15. A computer-readable storage medium having encoded thereon computer-executable instructions to cause one or more processing units of a system to perform the method of:
receiving input data from a first user for invoking the generation of a data structure configured to control access to the private content associated with common content, wherein the input data identifies the private content of the common content stored in at least one file;
generating the data structure comprising a first file and a second file in response to receiving the input data identifying the private content, wherein the first file comprises the private content, wherein the second file comprises the common content and excludes the private content;
configurating permission data for the first file and the second file in response to the input data identifying the private content, wherein the permission data is configured to allow the first user to view and modify the private content of the first, the permission data associates the first file to the first user, the permission data is configured to restrict other users from accessing the private content of the first file; the permission data is further configured to allow the other users to view and modify the common content of the second file; and
using the permission data to cause a first display of a first user interface arrangement for a first computing device associated with the first user, the first user interface arrangement comprising the private content from the first file and the common content, the permission data also permitting a second display of a second user interface arrangement for a second computing device associated with a second user of the other users, the second user interface arrangement comprising the common content from the second file, the permission data restricting the second computing device associated with a second user from receiving and displaying the private content from the first file.

16. The computer-readable storage medium of claim 15, wherein the first file further comprises common content, wherein the first file having the common content and the private content is generated in response to receiving the input data identifying the private content from common content of the at least one file.

17. The computer-readable storage medium of claim 15, wherein the method further comprises:
receiving additional input data from the second user, wherein the additional input data indicates modifications to the common content of the second file to generate modified content in the second file; and
propagating the modified content from the second file to the first file.

18. The computer-readable storage medium of claim 17, wherein the modified content that is propagated from the second file to the first file is controlled by the permission data, wherein the permission data allows the first user to view and modify the modified content.

19. The computer-readable storage medium of claim 15, wherein the first file is first metadata file associated with the first user, wherein the method further comprises:
generating a dynamically assembled file in response to a request from the first user to access the common content, wherein the generation of the dynamically assembled file comprises retrieving the common content from the second file and retrieving the private content from the first metadata file and integrating the private content from the first metadata file into the dynamically assembled file with the common content; and
communicating the dynamically assembled file to at least one computing device causing a display of the private content associated with the first user concurrently with the common content retrieved from the dynamically assembled file on the at least one computing device, wherein the communication of the dynamically assembled file is restricted from transmission to computing devices other than the at least one computing device associated with the first user.

20. The computer-readable storage medium of claim 15, wherein the method further comprises:
generating a second dynamically assembled file in response to a request from a second user to access the common content, wherein the generation of the second dynamically assembled file comprises retrieving the common content from the common document and retrieving private content from the second metadata file and integrating the private content from the second metadata file into the second dynamically assembled file with the common content; and
communicating the second dynamically assembled file to a second computing device causing a display of the private content associated with the second user concurrently with the common content retrieved from the second dynamically assembled file on the second computing device, wherein the communication of the second dynamically assembled file is restricted to communication to the second computing device associated with the second user.

* * * * *